(12) United States Patent
Vijay et al.

(10) Patent No.: US 11,249,892 B2
(45) Date of Patent: Feb. 15, 2022

(54) METHODS AND SYSTEMS FOR BACKUP MANAGEMENT

(71) Applicant: THE AIRGAP INC., Durham, NC (US)

(72) Inventors: Samudra Vijay, Durham, NC (US); Jamie Pleasants, Durham, NC (US)

(73) Assignee: THE AIRGAP INC., Durham, NC (US)

( * ) Notice: Subject to any disclaimer, the term of this patent is extended or adjusted under 35 U.S.C. 154(b) by 37 days.

(21) Appl. No.: 16/918,095

(22) Filed: Jul. 1, 2020

(65) Prior Publication Data

US 2022/0004485 A1 Jan. 6, 2022

(51) Int. Cl.
*G06F 11/00* (2006.01)
*G06F 11/36* (2006.01)
(Continued)

(52) U.S. Cl.
CPC ...... *G06F 11/3692* (2013.01); *G06F 11/1448* (2013.01); *G06F 11/1451* (2013.01);
(Continued)

(58) Field of Classification Search
CPC ............ G06F 11/1458; G06F 11/1448; G06F 11/1464; G06F 11/3692; G06F 11/3688;
(Continued)

(56) References Cited

U.S. PATENT DOCUMENTS 8,065,557 B2 * 11/2011 Hwang ............... G06F 11/1458
714/6.1
9,652,480 B2 * 5/2017 Gnech .................... G06F 16/27
(Continued)

*Primary Examiner* — Jonathan D Gibson
(74) *Attorney, Agent, or Firm* — Dicke, Billig & Czaja, PLLC

(57) ABSTRACT

A computer-implemented backup management method that includes performing a backup process or method for each one of N backup media storage devices, wherein N is an integer equal to or greater than 1. The method includes performing a filesystem integrity test on test data stored on a device connected to a primary network to obtain a baseline test result. The method includes activating a network switch to connect the primary network to an isolated network associated with one of the N backup media storage devices. The method includes storing a first backup copy of the user data stored on the device on the one of the N backup media storage devices. The first backup copy is stored over a first time period that begins when the storing of the first backup copy is initiated and ends when the storing of the first backup copy is completed. The method includes continuously verifying, during the first time period, an integrity of the test data by performing filesystem integrity tests on the test data to determine if a result of any of the filesystem integrity tests does not match the baseline test result which was obtained prior to the first time period. The method includes deactivating, during the first time period, the network switch if the result of any of the filesystem integrity tests on the test data does not match the baseline test result. The method includes deactivating, at the end of the first time period, the network switch if the result of all of the filesystem integrity tests on the test data each match the baseline test result. Deactivating the network switch isolates the one of the N backup media storage devices and the isolated network associated with the one of the N backup media storage devices from all outside networks including the primary network.

24 Claims, 13 Drawing Sheets

(51) Int. Cl.
  *G06F 11/14* (2006.01)
  *G06F 16/11* (2019.01)
(52) U.S. Cl.
  CPC ...... *G06F 11/1458* (2013.01); *G06F 11/1464* (2013.01); *G06F 11/3688* (2013.01); *G06F 16/11* (2019.01); *G06F 2201/80* (2013.01); *G06F 2201/82* (2013.01)
(58) Field of Classification Search
  CPC ............ G06F 11/1451; G06F 2201/80; G06F 2201/82; G06F 16/11; G06F 21/565
  See application file for complete search history.

(56) References Cited

U.S. PATENT DOCUMENTS

| | | | |
|---|---|---|---|
| 9,858,157 B2* | 1/2018 | Chavda | G06F 11/1438 |
| 10,592,352 B1* | 3/2020 | Tanaka | G06F 11/1469 |
| 10,922,189 B2* | 2/2021 | Swallow | G06F 11/2094 |
| 2004/0093555 A1* | 5/2004 | Therrien | G06F 11/1464 |
| | | | 714/805 |
| 2010/0257437 A1* | 10/2010 | Hwang | G06F 11/1458 |
| | | | 714/819 |
| 2018/0004604 A1* | 1/2018 | Khadiwala | G06F 16/10 |
| 2018/0121297 A1* | 5/2018 | Swallow | G06F 11/1464 |
| 2018/0143990 A1* | 5/2018 | Figueroa | G06F 11/1464 |
| 2018/0276019 A1* | 9/2018 | Ali | G06F 16/2365 |
| 2019/0392060 A1* | 12/2019 | Meiri | G06F 11/1448 |
| 2021/0149772 A1* | 5/2021 | Zatsepin | G06F 11/1451 |

* cited by examiner

METHODS AND SYSTEMS FOR BACKUP MANAGEMENT

FIELD OF TECHNOLOGY

The present application relates to computer security. More specifically, the present disclosure relates to improving data security and providing secure data backup and recovery.

BACKGROUND

In order to protect data assets and prevent loss, organizations typically backup their data on a periodic basis and create backup copies of the data at regular intervals, such as daily or weekly. The backup copy of the data can be stored at the same location as the data being backed up, or can be stored at a remote location.

Existing backup systems and processes are vulnerable to cyberattacks. Cybercriminals, once penetrating the organization's network, are often able to access and compromise the organization's data, and potentially the data backup because the backup media has a persistent connection to the main network and is not securely protected during the backup process. In addition, it can be difficult to detect the compromised data as cyberattacks have become more sophisticated and existing systems generally are not designed to detect real time infections by malware, computer viruses or other malicious code infections.

For these and other reasons, there is a need for the present invention.

SUMMARY

According to an embodiment of a method, the method includes performing, by a backup management system, a backup process or method for each one of N backup media storage devices, wherein N is an integer equal to or greater than 1. The method includes performing, by the backup management system, a filesystem integrity test on test data stored on a device connected to a primary network to obtain a baseline test result. The method includes activating, by the backup management system, a network switch to connect the primary network to an isolated network associated with one of the N backup media storage devices. The method includes storing, by the backup management system, a first backup copy of the user data stored on the device on the one of the N backup media storage devices, wherein the first backup copy is stored over a first time period that begins when the storing of the first backup copy is initiated and ends when the storing of the first backup copy is completed. The method includes continuously verifying, by the backup management system during the first time period, an integrity of the test data by performing filesystem integrity tests on the test data to determine if a result of any of the filesystem integrity tests does not match the baseline test result which was obtained prior to the first time period. The method includes deactivating, by the backup management system during the first time period, the network switch if the result of any of the filesystem integrity tests on the test data does not match the baseline test result to isolate the one of the N backup media storage devices and the isolated network associated with the one of the N backup media storage devices from all outside networks including the primary network. The method includes deactivating, by the backup management system at the end of the first time period, the network switch if the result of all of the filesystem integrity tests on the test data each match the baseline test result to isolate the one of the N backup media storage devices and the isolated network associated with the one of the N backup media storage devices from all outside networks including the primary network.

According to an embodiment of a backup management system, the backup management system includes at least one processor and at least one memory. The at least one memory stores program instructions that when executed by the at least one processor cause the backup management system to perform a backup process or method for each one of N backup media storage devices, where N is an integer equal to or greater than 1. The backup process includes performing, by the backup management system, a filesystem integrity test on test data stored on a device connected to a primary network to obtain a baseline test result. The backup process includes activating, by the backup management system, a network switch to connect the primary network to an isolated network associated with one of the N backup media storage devices. The backup process includes storing, by the backup management system, a first backup copy of the user data stored on the device on the one of the N backup media storage devices, wherein the first backup copy is stored over a first time period that begins when the storing of the first backup copy is initiated and ends when the storing of the first backup copy is completed. The backup process includes continuously verifying, by the backup management system during the first time period, an integrity of the test data by performing filesystem integrity tests on the test data to determine if a result of any of the filesystem integrity tests does not match the baseline test result which was obtained prior to the first time period. The backup process includes deactivating, by the backup management system during the first time period, the network switch if the result of any of the filesystem integrity tests on the test data does not match the baseline test result to isolate the one of the N backup media storage devices and the isolated network associated with the one of the N backup media storage devices from all outside networks including the primary network. The backup process includes deactivating, by the backup management system at the end of the first time period, the network switch if the result of all of the filesystem integrity tests on the test data each match the baseline test result to isolate the one of the N backup media storage devices and the isolated network associated with the one of the N backup media storage devices from all outside networks including the primary network.

According to an embodiment that includes one or more non-transitory, computer-readable storage media, that store program instructions that when executed on or across one or more computing devices each having at least one processor causes the one or more computing devices to perform a backup process or method for each one of N backup media storage devices, wherein N is an integer equal to or greater than 1. The one or more computing devices perform a filesystem integrity test on test data stored on a device connected to a primary network to obtain a baseline test result. The one or more computing devices activate a network switch to connect the primary network to an isolated network associated with one of the N backup media storage devices. The one or more computing devices store a first backup copy of the user data stored on the device on the one of the N backup media storage devices, wherein the first backup copy is stored over a first time period that begins when the storing of the first backup copy is initiated and ends when the storing of the first backup copy is completed. The one or more computing devices continuously verify during the first time period, an integrity of the test data by performing filesystem integrity tests on the test data to determine if a result of any of the filesystem integrity tests does not match the baseline test result which was obtained prior to the first time period. The one or more computing devices deactivate, during the first time period, the network switch if the result of any of the filesystem integrity tests on the test data does not match the baseline test result to isolate the one of the N backup media storage devices and the isolated network associated with the one of the N backup media storage devices from all outside networks including the primary network. The one or more computing devices deactivate, at the end of the first time period, the network switch if the result of all of the filesystem integrity tests on the test data each match the baseline test result to isolate the one of the N backup media storage devices and the isolated network associated with the one of the N backup media storage devices from all outside networks including the primary network.

Those skilled in the art will recognize additional features and advantages upon reading the following detailed description, and upon viewing the accompanying drawings.

BRIEF DESCRIPTION OF THE DRAWINGS

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Figure 1:
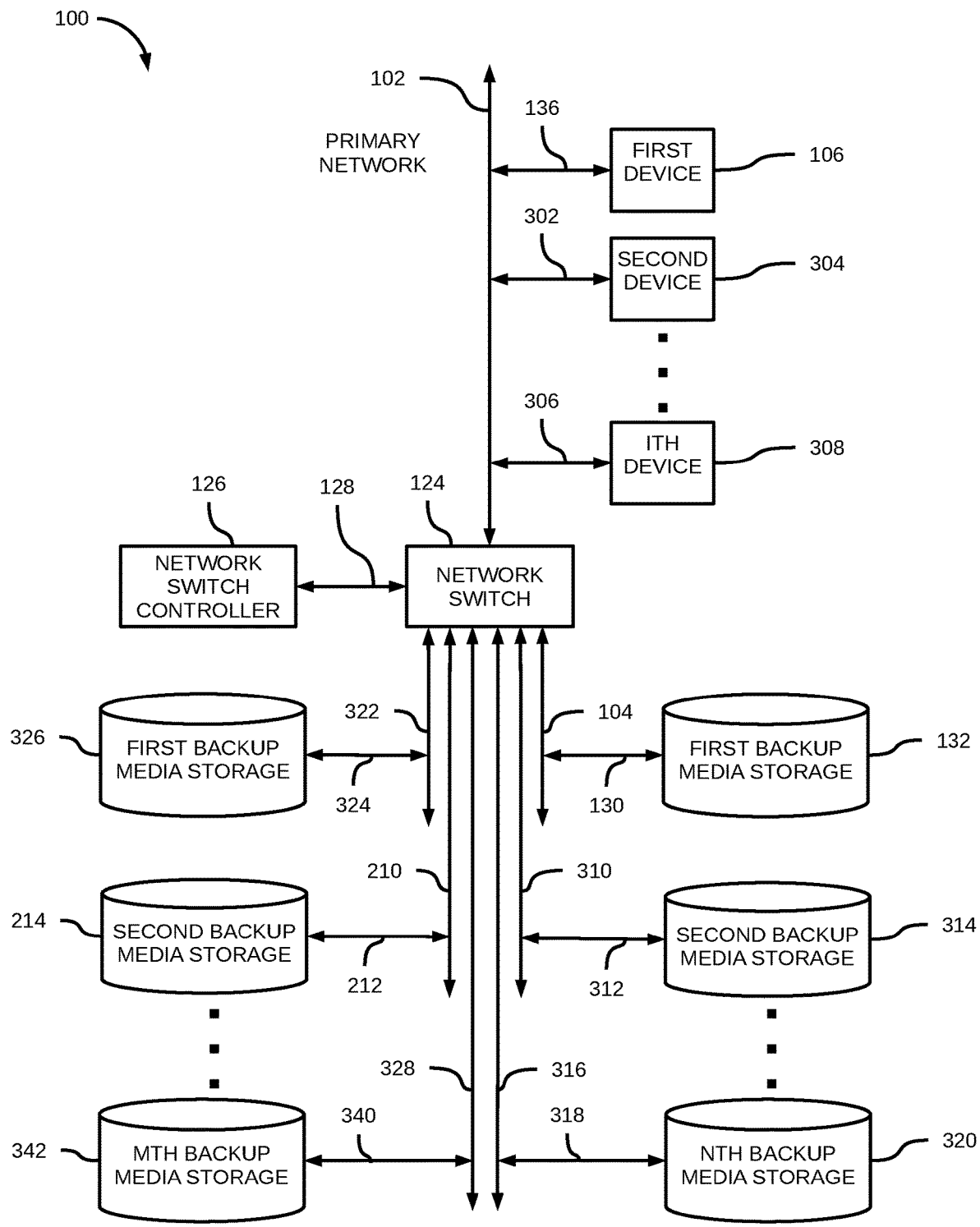
FIG. 1 illustrates a diagram of an embodiment of a backup management system that includes up to I devices on a primary network, up to M isolated networks with corresponding backup media storage devices and up to N isolated networks with corresponding backup media storage devices.

FIG. 1 illustrates a diagram at 100 of an embodiment of a backup management system that includes up to I devices on a primary network, up to M isolated networks with corresponding backup media storage devices and up to N isolated networks with corresponding backup media storage devices. In the embodiment illustrated in FIG. 1, I, M and N each are integers that are equal to or greater than 1. FIG. 1 illustrates computing devices which are first device 106, second device 304 and an Ith device 308. First device 106, second device 304 and the Ith device 308 can be any suitable kind of data processing device or system such as, for example, a server, a desktop computer, a laptop computer, a tablet, a mobile phone, a media player, a personal digital assistant (PDA), or a gaming device, or any combination thereof.

In the illustrated embodiment, first device 106 is coupled to primary network 102 via connection 136, second device 304 is coupled to primary network 102 via connection 302, and the Ith device 308 is coupled to primary network 102 via connection 306. FIG. 1 illustrates network switch 124 having connections to M isolated networks and N isolated networks. The M isolated networks include first isolated network 322, second isolated network 210 and an Mth isolated network 328. The N isolated networks include first isolated network 104, second isolated network 310 and an Nth isolated network 316. First backup media storage device 326 is connected to the first isolated network 322 via connection 324, second backup media storage device 214 is connected to the second isolated network 210 via connection 212, and the Mth backup media storage device 342 is connected to the Mth isolated network 328 via connection 340. First backup media storage device 132 is connected to the first isolated network 104 via connection 130, second backup media storage device 314 is connected to the second isolated network 310 via connection 312, and the Nth backup media storage device 320 is connected to the Nth isolated network 316 via connection 318.

In the illustrated embodiments, primary network 102, the M isolated networks and the N isolated networks may each be a Local Area Network (LAN). In other embodiments, primary network 102 can be other suitable types of networks such as a Metropolitan Area Network (MAN) or a Wide Area Network (WAN).

In the illustrated embodiment, the M isolated networks and the N isolated networks are each isolated from all outside or external networks including primary network 102. In this embodiment, each one of first isolated network 104, second isolated network 310 and the Nth isolated network 316, and each one of first isolated network 322, second isolated network 210 and the Mth isolated network 328, are secure computer networks that are physically isolated from unsecured networks and have no network interfaces, either wired or wireless, that are connected to any outside external networks such as, for example, an unsecured LAN. In one embodiment, each one of first isolated network 104, second isolated network 310 and the Nth isolated network 316, and each one of first isolated network 322, second isolated network 210 and the Mth isolated network 328, are physically disconnected from all outside or external networks. In one embodiment, each one of first isolated network 104, second isolated network 310 and the Nth isolated network 316, and each one of first isolated network 322, second isolated network 210 and the Mth isolated network 328 are physically disconnected from all outside or external networks such that they each may be considered an "air-gapped" network.

In the illustrated embodiment, network switch 124 can be activated by network switch controller 126 via connection 128 to connect the primary network 102 to any one of the first isolated network 104, the second isolated network 310 or the Nth isolated network 316, or to any one of the first isolated network 322, the second isolated network 210 or the Mth isolated network 328. Network switch 124 can be deactivated via network switch controller 126 to disconnect the primary network 102 from any one of the first isolated network 104, the second isolated network 310 or the Nth isolated network 316, or any one of the first isolated network 322, the second isolated network 210 or the Mth isolated network 328. When deactivated, first isolated network 104, second isolated network 310 and the Nth isolated network 316, and the first isolated network 322, second isolated network 210 and the Mth isolated network 328 are disconnected from all outside or external networks.

In the illustrated embodiment, network switch 124 can be activated by network switch controller 126 to connect any one of the first isolated network 104, the second isolated network 310, the Nth isolated network 316, the first isolated network 322, the second isolated network 210 or the Mth isolated network 328, to any other one of the first isolated network 104, the second isolated network 310, the Nth isolated network 316, the first isolated network 322, the second isolated network 210 or the Mth isolated network 328. Network switch 124 can be deactivated via network switch controller 126 to disconnect any one of the first isolated network 104, the second isolated network 310, the Nth isolated network 316, the first isolated network 322, the second isolated network 210 or the Mth isolated network 328, from any other one of the first isolated network 104, the second isolated network 310, the Nth isolated network 316, the first isolated network 322, the second isolated network 210 or the Mth isolated network 328. When deactivated, the first isolated network 104, the second isolated network 310, the Nth isolated network 316, the first isolated network 322, the second isolated network 210 or the Mth isolated network 328 are disconnected from all outside or external networks.

Figure 2:
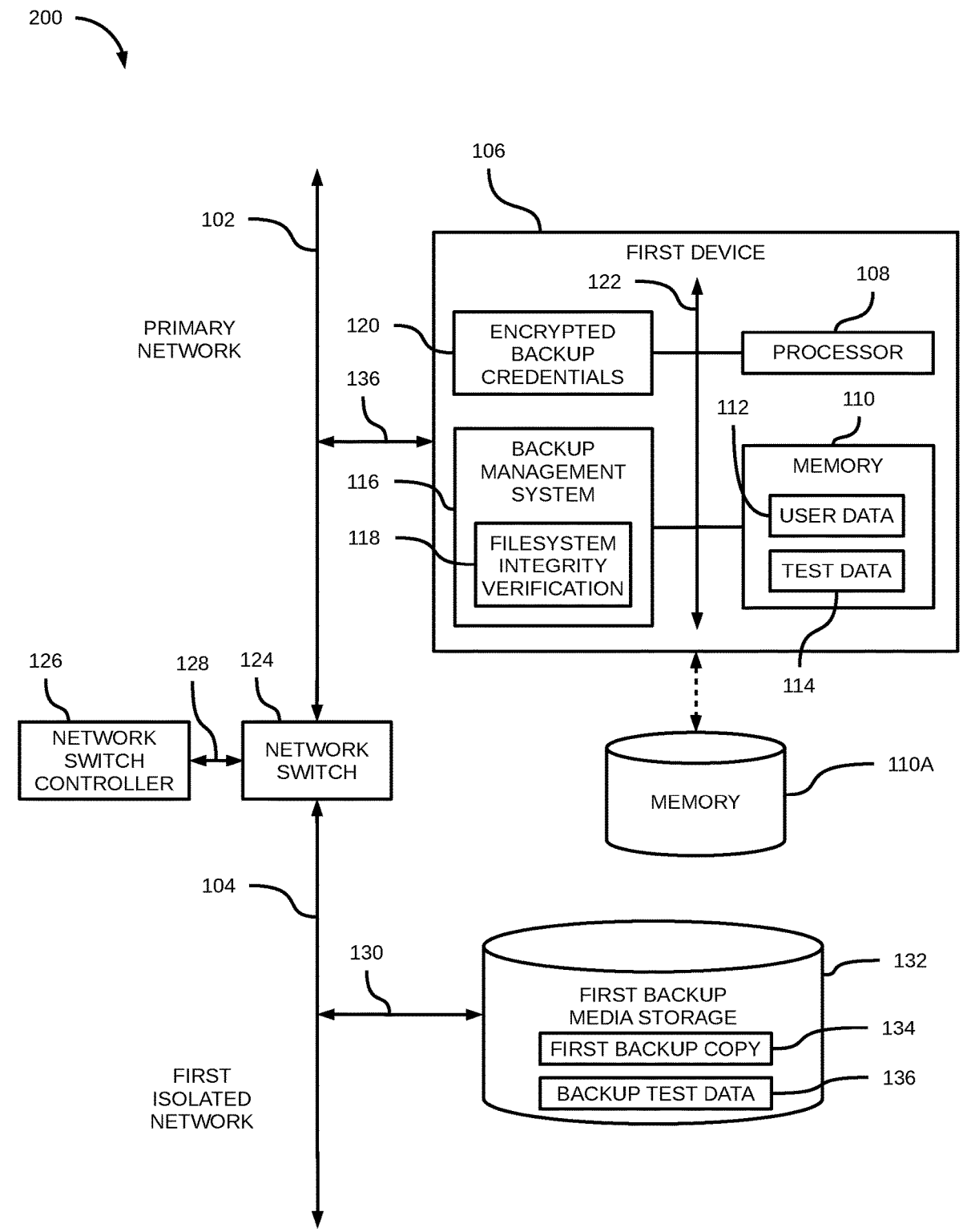
FIG. 2 illustrates a diagram of an embodiment of a backup management system that includes a primary network and a first isolated network.

FIG. 2 illustrates a diagram at 200 of an embodiment of a backup management system that includes a primary network 102 and a first isolated network 104. FIG. 2 illustrates an embodiment of FIG. 1 where I is an integer that is equal to or greater than 1 and N is an integer that is equal to or greater than 1. While only first device 106 is illustrated in FIG. 2, it is understood that the description for FIG. 2 can include any suitable number of devices including second device 304 and the Ith device 308 when I is an integer that is greater than 1. While only first backup media storage device 132 is illustrated in FIG. 2, it is understood that the description for FIG. 2 can include any suitable number of N backup media storage devices including second backup media storage device 314 and the Nth backup media storage device 320 when N is an integer that is greater than 1.

First device 106, second device 304 and the Ith device 308 each include at least one processor 108 and at least one memory 110. Memory 110 stores user data 112 and test data 114. In other embodiments, user data 112 and/or test data 114 may optionally be stored in memory 110A that is external to any of first device 106, second device 304 or the Ith device 308. In the illustrated embodiment, first device 106, second device 304 and the Ith device 308 each include a backup management system at 116. Backup management system 116 is connected to the at least one processor 108 and to the at least one memory 110 via a bus 122. The at least one memory 110 stores program instructions that when executed by the at least one processor 108 cause the backup management system 116 to perform backup processes as described herein.

In one embodiment, backup management system 116 represents script or operating system commands residing on first device 106, second device 304 or the Ith device 308 and/or stored in memory 110. The script or operating system commands are executed to perform the backup process. In one embodiment, the script is a PowerShell script. In various embodiments, any suitable operating system may be used by first device 106, second device 304 or the Ith device 308, such as, for example, Windows™ from Microsoft®, iOS™ or OS X™ from Apple®, Android™ from Google®, or other operating systems such as Unix or Linux. In various embodiments, backup system 116 has read-only access to user data 112, has read-only access to both user data 112 and test data 114, or has read-only access to all data stored on memory 110. Backup management system 116 within the first device 106, the second device 304 and the Ith device 308 may communicate via primary network 102 via any suitable networking protocol. First device 106, second device 304 and the Ith device 308 each may include one or more user input devices such as a keyboard, mouse, touchscreen, microphone, etc., to accept user input and may also include a display to provide a visual output to a user.

In the illustrated embodiment, first device 106, second device 304 and the Ith device 308 each include encrypted backup credentials at 120. Encrypted backup credentials 120 represents an authorization utility used to authenticate an authorized backup user using encrypted credentials at 120. The authorized backup user is an account on first device 106, second device 304 and the Ith device 308 that has read-only access to user data 112 stored on memory 110 on the respective first device 106, second device 304 and the Ith device 308. In one embodiment, the authorized backup user is an account on first device 106, second device 304 and the Ith device 308 that has read-only access to the N backup media storage devices (first backup media storage device 132, second backup media storage device 314 and the Nth backup media storage device 320), and read-only access to the M backup media storage devices (first backup media storage device 326, second backup media storage device 214 and the Mth backup media storage device 342). The account on first device 106, second device 304 and the Ith device 308 can be a Windows account for Windows software installed on first device 106, second device 304 and the Ith device 308. The Windows account may be a local Windows account or a remote Windows account. The Windows account can also be a Microsoft Windows account or a Windows Live ID account. The account on first device 106, second device 304 and the Ith device 308 may also be a Linux account for Linux software installed on first device 106, second device 304 and the Ith device 308. In other embodiments, other suitable accounts can be used.

In the illustrated embodiment, user data 112 and test data 114 are files and folders stored on memory 110. Test data 114 represents files and folders that are "sprinkled" through the backup source which is memory 110 and reside in different memory and/or file locations. The test data 114 files are files that should not be edited or changed unless primary network 102 and/or first device 106 have been infected by malware, a computer virus, a trojan-horse, hacker, or other malicious code infection. Test data 114 files may be located in a top-level directory and in different folders. For example, in the top-level directory, the test data 114 files are designated by first, middle and last file names, and the test data 114 files are in folders having the same file names and are in files within these folders as well. The test data 114 files are small in size, and in various embodiments take up less than 10 kilobytes of space within memory 110, or take up less than 7 kilobytes of space within memory 110. In one embodiment, the test data files 114 are backed up along with the user data 112 or user data 112 files by backup management system 116 as described herein. In another embodiment, the test data files 114 are not backed up and only user data 112 or user data 112 files are backed by backup management system 116 as described herein.

In the illustrated embodiment, backup management system 116 operates or controls network switch controller 126 to activate or deactivate network switch 124. Network switch controller 126 can be connected to first device 106, second device 304 and the Ith device 308 and backup management system 116 via primary network 102 or any other suitable wired or wireless network. First backup media storage device 132 is connected to first isolated network 104 via a connection at 130. If network switch 124 is activated to connect the primary network 102 to the first isolated network 104, first backup media storage device 132 is accessible by first device 106 via primary network 102. If network switch 124 is deactivated to disconnect the primary network 102 from the first isolated network 104, then first isolated network 104 and first backup media storage device 132 are disconnected from all outside or external networks including primary network 102.

In one embodiment, I and N are integers that are equal to or greater than 1. Backup management system 116 performs a backup process or method for each one of N backup media storage devices. The backup process or method for each one of the N backup media storage devices includes backing up the I devices on primary network 102 to a same one of first backup media storage device 132, second backup media storage device 314 or the Nth backup media storage device 320, or to different ones of first backup media storage device 132, second backup media storage device 314 or the Nth backup media storage device 320. The backup process can be completed for first device 106 if I is equal to 1, or for any suitable number of devices that may include first device 106, second device 304, and the Ith device 308 if I is greater than 1. The backup process for first device 106, second device 304, and the Ith device 308 can be completed in parallel, serially, or in any suitable order.

Referring to FIG. 2, the backup process performed by backup management system 116 is described with respect to first device 106 and first backup media storage device 132. In the illustrated embodiment, the same backup process described for first device 106 can be used for second device 304 and the Ith device 308. The same backup process described for first backup media storage device 132 can also be used for second backup media storage device 314 and the Nth backup media storage device 320. In the illustrated embodiments, one or more non-transitory, computer-readable storage media, store program instructions or script that when executed on or across one or more computing devices each having at least one processor causes the one or more computing devices to perform the backup process or method as described herein. In the illustrated embodiment, backup management system 116 performs the backup processes or methods as described herein by executing program instructions or script stored on the at least one memory 110 by the at least one processor 108.

The backup process includes backup management system 116, prior to a first time period, performing filesystem integrity verification 118 as a filesystem integrity test on test data 114 stored in memory 110 on first device 106 to obtain a baseline test result. The baseline test result is a baseline hash result obtained by applying a secure hashing algorithm (SHA) to the test data 114 prior to a first time period. In various embodiments, the SHA applied can be any suitable SHA which is a cryptographic hash function which takes an input (e.g. test data 114) and produces a hash result (also known as a message digest). Examples include, but are not limited to SHA-1, SHA-2 and SHA-3 hash algorithms. Any other suitable hash algorithm can be used.

The backup process includes backup management system 116 activating network switch 124 to connect primary network 102 to an isolated network associated with one of the N backup media storage devices. The N isolated networks include first isolated network 104, second isolated network 310 and the Nth isolated network 316. For the embodiment illustrated in FIG. 2, the isolated network associated with one of the N backup media storage devices is first isolated network 104. The backup process includes backup management system 116 storing a first backup copy 134 of user data 112 stored on first device 106 on the one of the N backup media storage devices. For the embodiment illustrated in FIG. 2, the one of the N backup media storage devices is first backup media storage device 132.

In the illustrated embodiment, the type of backup can include, but is not limited to, a file backup, a database backup, or a backup or copy of a system state or image. In one embodiment, only information within user data 112 that has changed since a previous backup is stored as the first backup copy 134 on the first backup media storage device 132. This may apply for a file backup. In other embodiments, with virtual machine, database or image backups, all user data 112 stored within memory 110 may be backed up and stored as the first backup copy 134 on the first backup media storage device 132. In the illustrated embodiment, a first backup copy 134 is stored over a first time period that begins when backup management system 116 initiates or executes the storing of the first backup copy 134, and ends when the storing of the first backup copy 134 by backup management system 116 is completed.

The backup process includes backup management system 116, during the first time period, continuously verifying an integrity of test data 114 by performing filesystem integrity tests on test data 114 to determine if a result of any of the filesystem integrity tests does not match the baseline test result which was obtained prior to the first time period. Determining if a result of any of the filesystem integrity tests does not match the baseline test result includes, for each one of the filesystem integrity tests, applying the secure hashing algorithm to the test data 114 to obtain a hash result for the test data 114, and comparing the hash result for the test data 114 to the baseline test result or baseline hash result to determine if the hash result for the test data 114 matches the baseline hash result. The baseline hash result is obtained by applying the secure hashing algorithm to the test data 114 prior to the first time period. The filesystem integrity tests performed on test data 114 utilize the same secure hashing algorithm that was used to obtain the baseline hash result. In other embodiments, different secure hashing algorithms can be used.

In some embodiments, performing the filesystem integrity tests on the test data 114 and storing the first backup copy 134 on the one of the N backup media storage devices or the first backup media storage device 132 includes backup management system 116 having read-only access to user data 112 and test data 114 stored on first device 106, and having read-only access to the one of the N backup media storage devices. The one of the N backup media storage devices can include first backup media storage device 132, second backup media storage device 314, and the Nth backup media storage device 320.

In some embodiments, backup management system 116 determines if the test data 114 or the test data 114 files exist before performing filesystem integrity tests on test data 114. The importance of checking if the files exist may be based on the potential of ransomware changing the name of any of the test data 114 files. In some embodiments, backup management system 116, either before or at the beginning of the first time period and before performing a first one of the filesystem integrity tests on test data 114, determines if the test data 114 or the test data 114 files exist. In some embodiments, if any of the test data 114 file names do not exist, backup management system 116 stops storing the first backup copy 134 of user data 112, or the first backup copy 134 of user data 112 and test data 114, on the first backup media storage device 132. In some embodiments, if any of the test data 114 file names do not exist, backup management system 116 immediately deactivates network switch 124 via network switch controller 126 in order to isolate the first isolated network 104 and first backup media storage device 132 from all outside networks including the primary network 102. In some embodiments, if any of the test data 114 file names do not exist, backup management system 116 sends out an alert or notification via email or text messages to first device 106 or to a network administrator of primary network 102. If the test data 114 or the test data 114 files do exist, backup management system 116, during the first time period, continuously verifies an integrity of test data 114 by performing filesystem integrity tests on test data 114 to determine if a result of any of the filesystem integrity tests does not match the baseline test result which was obtained prior to the first time period. In one embodiment, backup management system 116 continuously verifying the integrity of test data 114 includes simultaneously performing the filesystem integrity tests on test data 114 and storing the first backup copy 134 of user data 112 on the first backup media storage device 132 during the first time period.

The backup process includes backup management system 116, during the first time period, deactivating network switch 124 via network switch controller 126 if the result of any of the filesystem integrity tests performed on test data 114 do not match the baseline test result or baseline hash result in order to isolate the one of the N backup media storage devices (first backup media storage device 132 illustrated in FIG. 2) and the isolated network (first isolated network 104 illustrated in FIG. 2) associated with the one of the N backup media storage devices (first backup media storage device 132 illustrated in FIG. 2) from all outside networks including the primary network 102. The backup process includes backup management system 116, at the end of the first time period, deactivating network switch 124 via network switch controller 126 if the result of all of the filesystem integrity tests performed on test data 114 each match the baseline test result or baseline hash result in order to isolate the one of the N backup media storage devices (first backup media storage device 132 illustrated in FIG. 2) and the isolated network (first isolated network 104 illustrated in FIG. 2) associated with the one of the N backup media storage devices (first backup media storage device 132 illustrated in FIG. 2) from all outside networks including the primary network 102.

In the illustrated embodiment, backup management system 116 may send logs and/or alerts via email or text messages before, during and after the first time period. For example, backup management system 116 may send logs and/or alerts via email or text messages to first device 106 or to a network administrator of primary network 102 if the result of any of the filesystem integrity tests performed on test data 114 does not match the baseline test result or baseline hash result. Backup management system 116 may send logs and/or alerts via email or text messages to first device 106 or to a network administrator of primary network 102 if any of the test data 114 file names do not exist. Backup management system 116 may send logs and/or alerts via email or text messages to first device 106 or to a network administrator of primary network 102 at the end of the first time period when the storing of the first backup copy 134 is completed. Backup management system 116 may send logs and/or alerts via email or text messages to first device 106 or to a network administrator of primary network 102 if backup management system 116 deactivates the network switch 124 to isolate any one of the first backup media storage device 132, the second backup media storage device 314, or the Nth backup media storage device 320, as well as the isolated network associated with the one of the N backup media storage devices.

Backup management system 116 may retrieve usage data from any one of the N backup media storage devices in order to optimize or minimize the first time period or data storage usage efficiency when storing the first backup copy 134 of user data 112 on first backup media storage device 132, or on any of the N backup media storage devices. Backup management system 116 may delete data stored on any one of the first backup media storage device 132, the second backup media storage device 314, or the Nth backup media storage device 320, that is older than a retention period that is configured or identified within the script or program instructions stored on memory 110.

Figure 9:
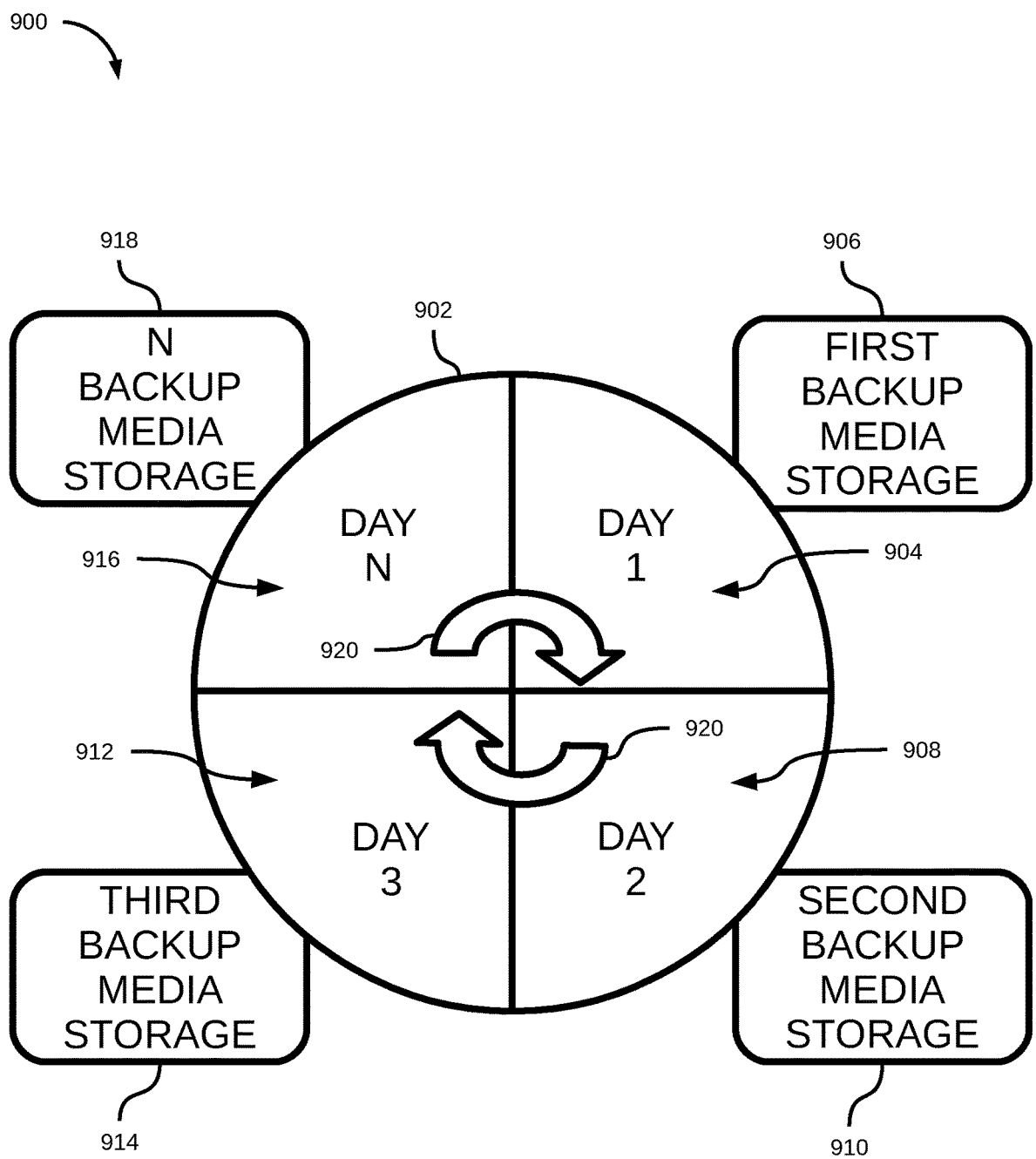
FIG. 9 illustrates a diagram of an embodiment of a cyclic backup method.

The backup process performed by backup management system 116 with respect to first device 106 can be performed on a repeating or cyclic basis using a cyclic backup method or process as described with respect to FIG. 9. In this embodiment, performing the backup process for each one of the N backup media storage devices comprises performing the backup process for each one the N backup media storage devices at different points in time or successive time intervals for a set of N successive times, wherein N is greater than 1. The set of the N successive times corresponds to a backup cycle for first device 106 and the N backup media storage devices. In the illustrated embodiment, the backup cycle may be a repeating backup cycle.

Figure 3:
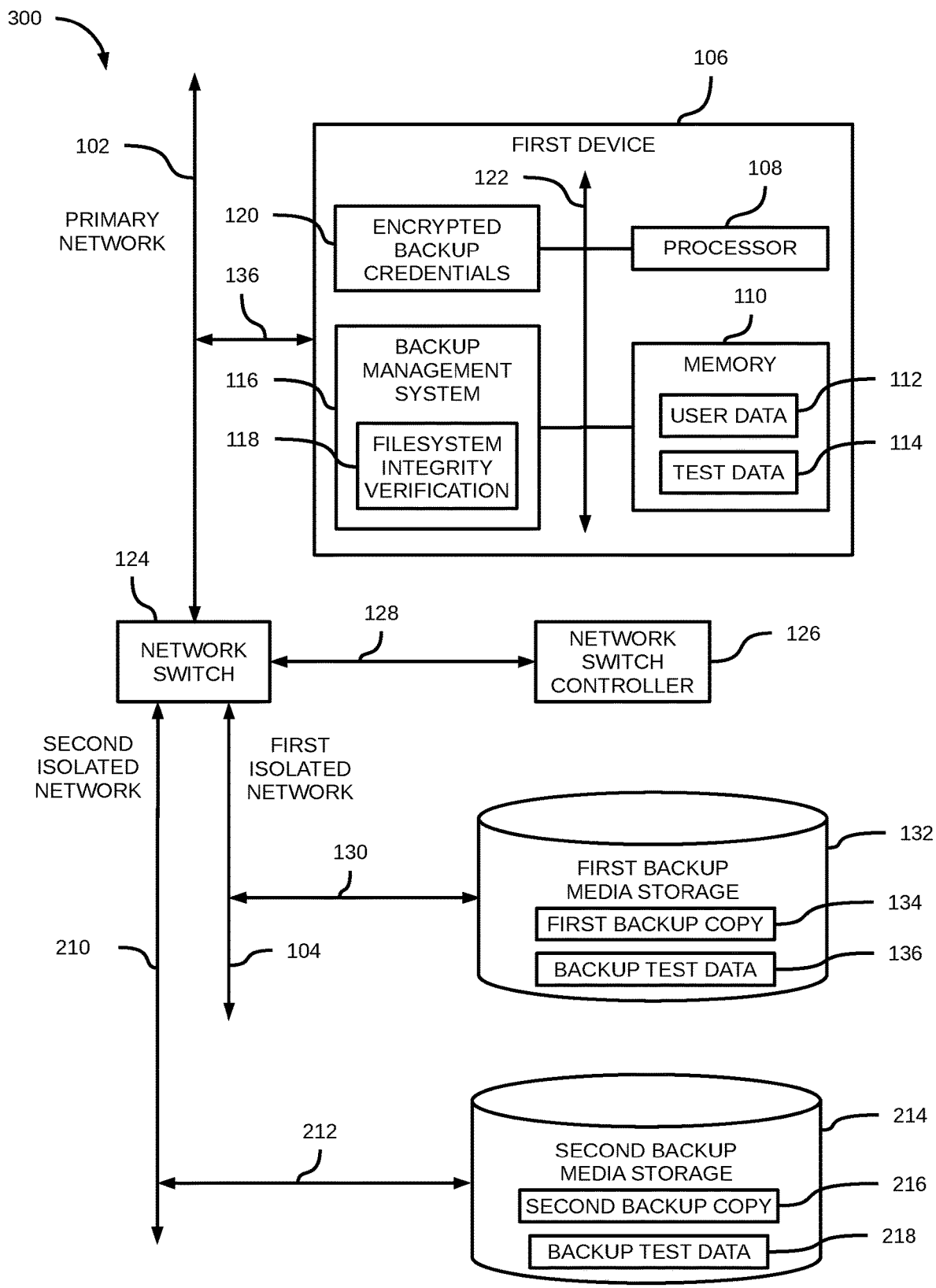
FIG. 3 illustrates a diagram of an embodiment of a backup management system that includes a primary network, a first isolated network and a second isolated network.

FIG. 3 illustrates a diagram at 300 of an embodiment of a backup management system that includes a primary network 102, a first isolated network 104 and a second isolated network 210. FIG. 3 illustrates embodiments of FIG. 1 where I is an integer that is equal to or greater than 1, M is an integer that is equal to or greater than 1 and N is an integer that is equal to or greater than 1. While only first device 106 is illustrated in FIG. 3, it is understood that the description for FIG. 3 can include any suitable number of devices including second device 304 and the Ith device 308 when I is an integer that is greater than 1.

Backup management system 116 performs a backup process or method for each one of M backup media storage devices that includes backing up any one or more of the N backup media storage devices (e.g., first backup media storage device 132, second backup media storage device 314 or the Nth backup media storage device 320), to any one or more of the M backup media storage devices (e.g., first backup media storage device 326, second backup media storage device 214 or the Mth backup media storage device 342).

In another embodiment, backup management system 116 performs a backup process or method for each one of M backup media storage devices that includes backing up any one or more of the M backup media storage devices (e.g., first backup media storage device 326, second backup media storage device 214 or the Mth backup media storage device 342), to any other one or more of the M backup media storage devices (e.g., first backup media storage device 326, second backup media storage device 214 or the Mth backup media storage device 342).

In the illustrated embodiment, the first backup copy 134 of user data 112 and backup test data 136 are files and folders stored on first backup media storage device 132 that can also be stored on other ones of the N backup media storage devices. The second backup copy 216 and backup test data 218 are files and folders stored on second backup media storage device 214 that can also be stored on other ones of the M backup media storage devices. Backup test data 136 and backup test data 218 represent files and folders that are "sprinkled" through the backup source which are respectively first backup media storage device 132 and the second backup media storage device 214, and that reside in different memory and/or file locations. The backup test data 136 and backup test data 218 files are files that should not be edited or changed unless first isolated network 104 and first backup media storage device 132, or second isolated network 210 and second backup media storage device 214, have been infected by malware, a computer virus, a trojan-horse, hacker, or other malicious code infection. Backup test data 136 and backup test data 218 files may be located in a top-level directory and in different folders. For example, in the top-level directory, the backup test data 136 files and the backup test data 218 files are designated by first, middle and last file names, and the backup test data 136 files and the backup test data 218 files are in folders having the same file names and are in files within these folders as well. The backup test data 136 files and the backup test data 218 files are small in size, and in various embodiments take up less than 10 kilobytes of space within, respectively, first backup media storage device 132 and second backup media storage device 214, or may take up less than 7 kilobytes of space within, respectively, first backup media storage device 132 and second backup media storage device 214. In one embodiment, the backup test data 136 files and the backup test data 218 files are backed up along with, respectively, the first backup copy 134 and the second backup copy 216 by backup management system 116 as described herein. In another embodiment, the backup test data 136 files and the backup test data 218 files are not backed up and only the first backup copy 134 and the second backup copy 216 are backed up by backup management system 116 as described herein.

The backup process performed by backup management system 116 in first device 106 is described with respect to first backup media storage device 132 and second backup media storage device 214. The backup process performed by backup management system 116 can also be performed for any one of M backup media storage devices, wherein M is an integer that is equal to or greater than 1. On one embodiment, the backup process performed by backup management system 116 with respect to FIG. 3 is performed after the backup process described with respect to FIG. 2.

In the illustrated embodiments, one or more non-transitory, computer-readable storage media, store program instructions or script that when executed on or across one or more computing devices each having at least one processor causes the one or more computing devices to perform the backup process or method as described herein. In the illustrated embodiment, backup management system 116 performs the backup process or method as described herein by executing program instructions or script stored on the at least one memory 110 by the at least one processor 108.

The backup process includes backup management system 116, prior to a second time period, performing filesystem integrity verification 118 as a filesystem integrity test on backup test data 136 stored on the one of the N backup media storage devices which is first backup media storage device 132 to obtain a first backup baseline test result. The first backup baseline test result is a first backup baseline hash result obtained by applying a secure hashing algorithm (SHA) to the backup test data 136 prior to a second time period. In various embodiments, the SHA applied can be any suitable SHA which is a cryptographic hash function which takes an input (e.g. backup test data 136) and produces a hash result (also known as a message digest). Examples include, but are not limited to SHA-1, SHA-2 and SHA-3 hash algorithms. In other embodiments, any suitable hash algorithm can be used.

The backup process includes backup management system 116 activating network switch 124 to connect the isolated network (first isolated network 104 illustrated in FIG. 3) associated with the one of the N backup media storage devices (first backup media storage device 132 illustrated in FIG. 3), to an isolated network (second isolated network 210 illustrated in FIG. 3) associated with one of the M backup media storage devices (second backup media storage device 214 illustrated in FIG. 3). The backup process includes backup management system 116 storing a second backup copy 216 of the first backup copy 134 stored on the one of the N backup media storage devices (first backup media storage device 132 illustrated in FIG. 3) on the one of the M backup media storage devices (second backup media storage device 214 illustrated in FIG. 3).

In the illustrated embodiment, the type of backup can include, but is not limited to, a file backup, a database backup, or a backup or copy of a system state or image. In one embodiment, only information within first backup copy 134 that has changed since a previous backup is stored as the second backup copy 216 on the second backup media storage device 214. This may apply for a file backup. In other embodiments, with virtual machine, database or image backups, all of the first backup copy 134 stored on first backup media storage device 132 is backed up and stored as the second backup copy 216 on the second backup media storage device 214. In the illustrated embodiment, the second backup copy 216 is stored over a second time period that begins when backup management system 116 initiates or executes the storing of the second backup copy 216, and ends when the storing of the second backup copy 216 by backup management system 116 is completed.

The backup process includes backup management system 116, during the second time period, continuously verifying an integrity of backup test data 136 by performing filesystem integrity tests on backup test data 136 to determine if a result of any of the filesystem integrity tests does not match the first backup baseline test result which was obtained prior to the second time period. Determining if a result of any of the filesystem integrity tests does not match the first backup baseline test result includes, for each one of the filesystem integrity tests, applying the secure hashing algorithm to the backup test data 136 to obtain a hash result for the backup test data 136, and comparing the hash result for the backup test data 136 to the first backup baseline test result or first backup baseline hash result to determine if the hash result for the backup test data 136 matches the first backup baseline hash result. The first backup baseline hash result is obtained by applying the secure hashing algorithm to the backup test data 136 prior to the second time period. The filesystem integrity tests performed on backup test data 136 utilize the same secure hashing algorithm that was used to obtain the first backup baseline hash result. In other embodiments, different secure hashing algorithms can be used.

In some embodiments, performing the filesystem integrity tests on the backup test data 136 and storing the second backup copy 216 on the one of the M backup media storage devices or the second backup media storage device 214 as illustrated in FIG. 3 includes backup management system 116 having read-only access to first backup copy 134 and backup test data 136 stored on first backup media storage device 132, having read-only access to second backup media storage device 214, and having read-only access to other ones of the N backup media storage devices and other ones of the M backup media storage devices (see also, FIG. 1).

In some embodiments, backup management system 116 determines if the backup test data 136 or the backup test data 136 files exist before performing filesystem integrity tests on backup test data 136. The importance of checking if the files exist may be based on the potential of ransomware changing the name of any of the backup test data 136 files. In some embodiments, backup management system 116, either before or at the beginning of the second time period and before performing a first one of the filesystem integrity tests on backup test data 136, determines if the backup test data 136 or the backup test data 136 files exist. In some embodiments, if any of the backup test data 136 file names do not exist, backup management system 116 stops storing the second backup copy 216 of the first backup copy 134 on second backup media storage device 214. In some embodiments, if any of the backup test data 136 file names do not exist, backup management system 116 immediately deactivates network switch 124 via network switch controller 126 in order to isolate the one of the M backup media storage devices (second backup media storage device 214 illustrated in FIG. 3) and the isolated network (second isolated network 210 illustrated in FIG. 3) that is associated with the one of the M backup media storage devices (second backup media storage device 214 illustrated in FIG. 3), from all of the outside networks including the primary network 102 and the isolated network (first isolated network 104 illustrated in FIG. 3) associated with the one of the N backup media storage devices (first backup media storage device 132 illustrated in FIG. 3). In some embodiments, if any of the backup test data 136 file names do not exist, backup management system 116 sends out an alert or notification via email or text messages to first device 106 or to a network administrator of primary network 102. If the backup test data 136 or the backup test data 136 files do exist, backup management system 116, during the second time period, continuously verifies an integrity of backup test data 136 by performing filesystem integrity tests on backup test data 136 to determine if a result of any of the filesystem integrity tests does not match the first backup baseline test result which was obtained prior to the second time period. In one embodiment, backup management system 116 continuously verifying the integrity of backup test data 136 includes simultaneously performing the filesystem integrity tests on backup test data 136 and storing the second backup copy 216 on the second backup media storage device 214.

In the illustrated embodiment, the backup process includes backup management system 116, during the second time period, deactivating network switch 124 via network switch controller 126 if the result of any of the filesystem integrity tests performed on backup test data 136 do not match the first backup baseline test result or first backup baseline hash result in order to isolate the one of the M backup media storage devices (second backup media storage device 214 illustrated in FIG. 3) and the isolated network (second isolated network 210 illustrated in FIG. 3) that is associated with one of the M backup media storage devices (second backup media storage device 214 illustrated in FIG. 3), from all of the outside networks including the primary network 102 and the isolated network (first isolated network 104 illustrated in FIG. 3) associated with the one of the N backup media storage devices (first backup media storage device 132 illustrated in FIG. 3).

The backup process includes backup management system 116, at the end of the second time period, deactivating network switch 124 via network switch controller 126 if the result of all of the filesystem integrity tests performed on backup test data 136 each match the first backup baseline test result or the first backup baseline hash result in order to isolate the one of the M backup media storage devices (second backup media storage device 214 illustrated in FIG. 3) and the isolated network (second isolated network 210 illustrated in FIG. 3) that is associated with one of the M backup media storage devices (second backup media storage device 214 illustrated in FIG. 3), from all of the outside networks including the primary network 102 and the isolated network (first isolated network 104 illustrated in FIG. 3) associated with the one of the N backup media storage devices (first backup media storage device 132 illustrated in FIG. 3).

Figure 10:
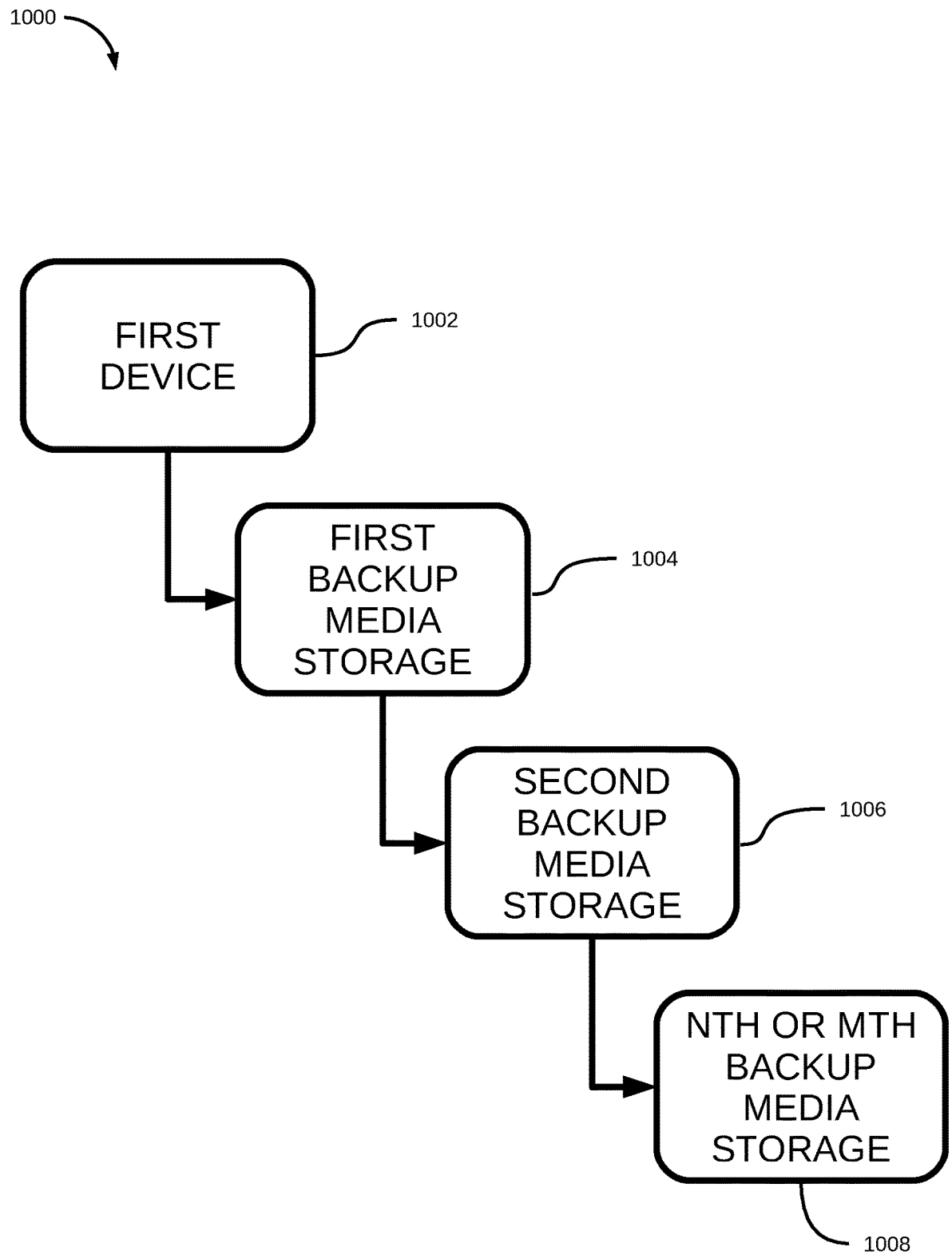
FIG. 10 illustrates a diagram of an embodiment of a cascading backup method.

The backup process described above for the one of the M backup media storage devices (e.g., second backup media storage device 214 illustrated in FIG. 3) of storing the first backup copy 134 stored on the one of the N backup media storage devices (e.g., first backup media storage device 132) as a second backup copy 216 on the one of the M backup media storage devices (e.g., second backup media storage device 214 illustrated in FIG. 3) can be repeated in a cascading backup method using the same backup process illustrated in FIG. 3 (see also, FIG. 10). For example, the second backup copy 216 stored on the one of the M backup media storage devices can be stored as a third backup copy on another one of the M or N backup media storage devices. The third backup copy stored on the another one of the M or N backup media storage devices can be stored as a fourth backup copy on yet another one of the M or N backup storage devices.

An embodiment of using the cascading backup method is described with respect to FIG. 3 for storing a second backup copy 216 that is stored on one of the M backup media storage devices (second backup media storage device 214 illustrated in FIG. 3) as a third backup copy on another one of the M backup media storage devices (first backup media storage device 326 illustrated in FIG. 1). The backup process includes backup management system 116 on first device 106, prior to a third time period, performing a filesystem integrity verification 118 as a filesystem integrity test on backup test data 218 stored on the one of the M backup media storage devices (second backup media storage device 214 illustrated in FIG. 3) to obtain a second backup baseline test result. The second backup baseline test result is a second backup baseline hash result obtained by applying the secure hashing algorithm (SHA) to the backup test data 218 prior to the third time period. In various embodiments, the SHA applied can be any suitable SHA which is a cryptographic hash function which takes an input (e.g. backup test data 218) and produces a hash result (also known as a message digest). Examples include, but are not limited to SHA-1, SHA-2 and SHA-3 hash algorithms. In other embodiments, other suitable hash algorithm can be used.

The backup process includes backup management system 116 activating network switch 124 to connect the isolated network (second isolated network 210 illustrated in FIG. 1 and FIG. 3) associated with the one of the M backup media storage devices (second backup media storage device 214 illustrated in FIG. 1 and FIG. 3), to an isolated network (first isolated network 322 illustrated in FIG. 1) associated with another one of the M backup media storage devices (first backup media storage device 326 illustrated in FIG. 1). The backup process includes backup management system 116 storing a third backup copy of the second backup copy 216 stored on the one of the M backup media storage devices (second backup media storage device 214 illustrated in FIG. 1 and FIG. 3) on the another one of the M backup media storage devices (first backup media storage device 326 illustrated in FIG. 1). The third backup copy is stored over a third time period that begins when backup management system 116 initiates or executes the storing of the third backup copy and ends when the storing of the third backup copy by backup management system 116 is completed.

The backup process includes backup management system 116, during the third time period, continuously verifying an integrity of backup test data 218 by performing filesystem integrity tests on backup test data 218 to determine if a result of any of the filesystem integrity tests does not match the second backup baseline test result which was obtained prior to the third time period. Determining if a result of any of the filesystem integrity tests does not match the second backup baseline test result includes, for each one of the filesystem integrity tests, applying the secure hashing algorithm to the backup test data 218 to obtain a hash result for the backup test data 218, and comparing the hash result for the backup test data 218 to the second backup baseline test result or second backup baseline hash result to determine if the hash result for the backup test data 218 matches the second backup baseline hash result. The second backup baseline hash result is obtained by applying the secure hashing algorithm to the backup test data 218 prior to the third time period. The filesystem integrity tests performed on backup test data 218 utilize the same secure hashing algorithm that was used to obtain the second backup baseline hash result. In other embodiments, different secure hashing algorithms can be used.

The backup process includes backup management system 116, during the third time period, deactivating network switch 124 via network switch controller 126 if the result of any of the filesystem integrity tests performed on backup test data 218 do not match the second backup baseline test result or second backup baseline hash result in order to isolate the another one of the M backup media storage devices (first backup media storage device 326 illustrated in FIG. 1) and the isolated network (first isolated network 322 illustrated in FIG. 1) associated with the another one of the M backup media storage devices (first backup media storage device 326 illustrated in FIG. 1) from all outside networks including the primary network 102, the isolated network (second isolated network 210 illustrated in FIG. 1 and FIG. 3) associated with the one of the M backup media storage devices (second backup media storage device 214 illustrated in FIG. 1 and FIG. 3) and the isolated network (first isolated network 104 illustrated in FIG. 1 and FIG. 3) associated with the one of the N backup media storage devices (first backup media storage device 132 illustrated in FIG. 1 and FIG. 3).

The backup process includes backup management system 116, at the end of the third time period, deactivating network switch 124 via network switch controller 126 if the result of all of the filesystem integrity tests performed on backup test data 218 each match the second backup baseline test result or the second backup baseline hash result in order to isolate the another one of the M backup media storage devices (first backup media storage device 326 illustrated in FIG. 1) and the isolated network (first isolated network 322 illustrated in FIG. 1) associated with the another one of the M backup media storage devices (first backup media storage device 326 illustrated in FIG. 1) from all outside networks including the primary network 102, the isolated network (second isolated network 210 illustrated in FIG. 1 and FIG. 3) associated with the one of the M backup media storage devices (second backup media storage device 214 illustrated in FIG. 1 and FIG. 3) and the isolated network (first isolated network 104 illustrated in FIG. 1 and FIG. 3) associated with the one of the N backup media storage devices (first backup media storage device 132 illustrated in FIG. 1 and FIG. 3).

In some embodiments, the second time period and the third time period at least partially overlap in time. In some embodiments, the first time period, the second time period and the third time period at least partially overlap in time. In other embodiments, the second time period and the third time period, or the first time period, the second time period and the third time period, do not overlap in time.

Figure 4:
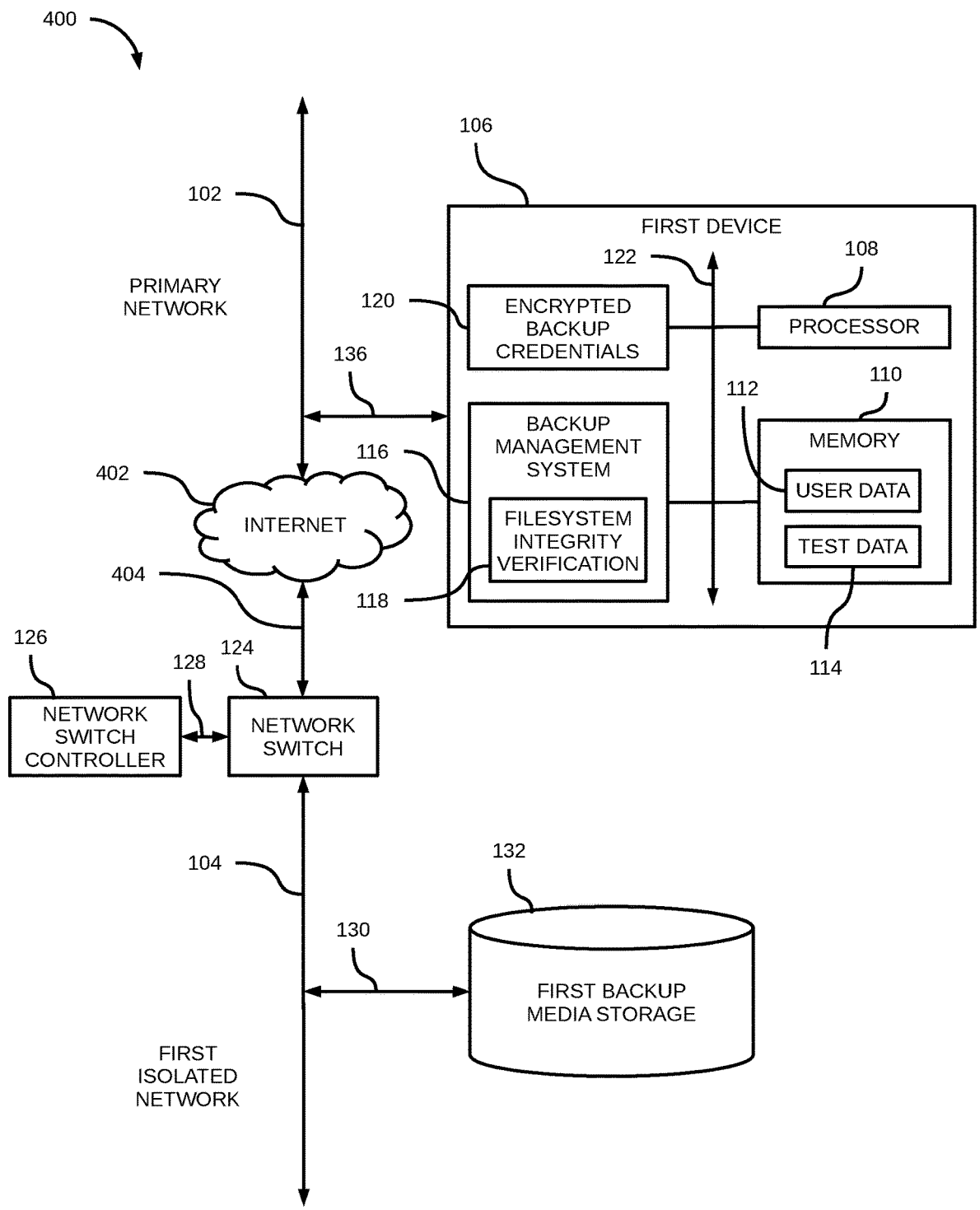
FIG. 4 illustrates a diagram of an alternative embodiment of the backup management system illustrated in FIGS. 1-3.

FIG. 4 illustrates a diagram at 400 of an embodiment of the backup management system illustrated in FIGS. 1-3 where primary network 102 is connected via an internet connection or cloud-based connection illustrated at 402 to first network switch 124 via connection 404.

Figure 5:
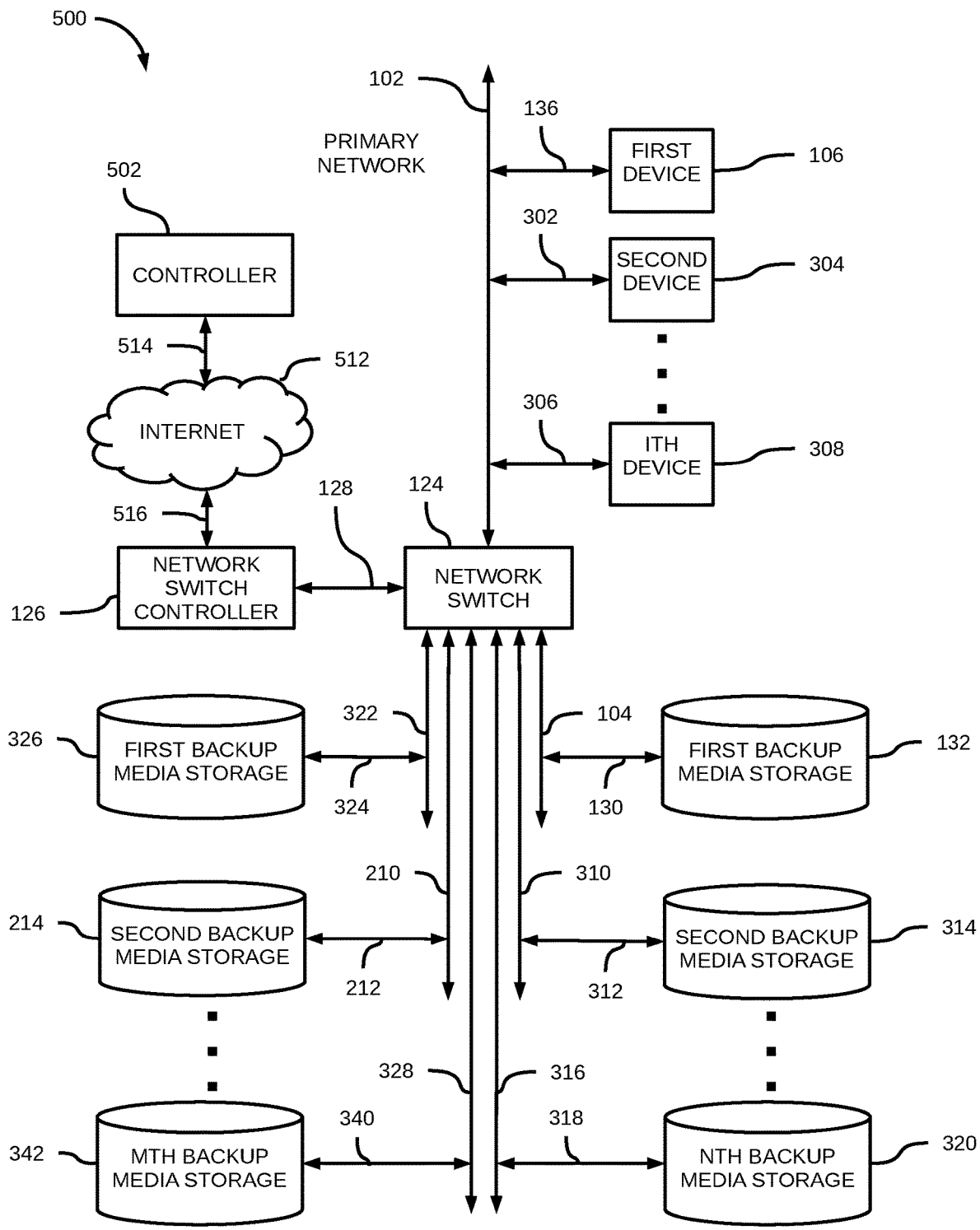
FIG. 5 illustrates a diagram of an embodiment of a backup management system that includes up to I devices on a primary network, up to M isolated networks with corresponding backup media storage devices and up to N isolated networks with corresponding backup media storage devices.

FIG. 5 illustrates a diagram at 500 of an alternative embodiment of a backup management system that includes up to I devices on a primary network, up to M isolated networks with corresponding backup media storage devices and up to N isolated networks with corresponding backup media storage devices. In the embodiment illustrated in FIG. 5, I, M and N each are integers that are equal to or greater than 1. FIG. 5 illustrates a controller 502 that is coupled to and in communication with network switch controller 126 via an internet connection at 512 via connections 514 and 516. FIG. 5 illustrates computing devices which are first device 106, second device 304 and the Ith device 308. First device 106, second device 304 and the Ith device 308 can be any suitable kind of data processing device or system such as, for example, a server, a desktop computer, a laptop computer, a tablet, a mobile phone, a media player, a personal digital assistant (PDA), or a gaming device, or any combination thereof.

In the embodiments illustrated in FIGS. 1-4, first device 106, second device 304 and the Ith device 308 each include a backup management system 116 with filesystem integrity verification 118. In the embodiments illustrated in FIGS. 5-8, first device 106, second device 304 and the Ith device 308 each include a secure agent 522 with filesystem verification 524 and do not have the backup management system 116. In the embodiments illustrated in FIGS. 5-8, a controller with a backup management system 504 executes the backup process and processes described herein by communicating with secure agent 522 on first device 106, second device 304 and the Ith device 308.

In the illustrated embodiment, first device 106 is coupled to primary network 102 via connection 136, second device 304 is coupled to primary network 102 via connection 302, and the Ith device 308 is coupled to primary network 102 via connection 306. FIG. 5 illustrates network switch 124 having connections to M isolated networks and N isolated networks. The M isolated networks include first isolated network 322, second isolated network 210 and the Mth isolated network 328. The N isolated networks include first isolated network 104, second isolated network 310 and the Nth isolated network 316. First backup media storage device 326 is connected to the first isolated network 322 via connection 324, second backup media storage device 214 is connected to the second isolated network 210 via connection 212, and the Mth backup media storage device 342 is connected to the Mth isolated network 328 via connection 340. First backup media storage device 132 is connected to the first isolated network 104 via connection 130, second backup media storage device 314 is connected to the second isolated network 310 via connection 312, and the Nth backup media storage device 320 is connected to the Nth isolated network 316 via connection 318.

In the illustrated embodiments, primary network 102, the M isolated networks and the N isolated networks may each be a Local Area Network (LAN). In other embodiments, primary network 102 can be other suitable types of networks such as a Metropolitan Area Network (MAN) or a Wide Area Network (WAN).

In the illustrated embodiment, the M isolated networks and the N isolated networks are each are isolated from all outside or external networks including primary network 102. In this embodiment, each one of first isolated network 104, second isolated network 310 and the Nth isolated network 316, and each one of first isolated network 322, second isolated network 210 and the Mth isolated network 328, are secure computer networks that are physically isolated from unsecured networks and that have no network interfaces, either wired or wireless, that are connected to any outside external networks such as, for example, an unsecured LAN. In one embodiment, each one of first isolated network 104, second isolated network 310 and the Nth isolated network 316, and each one of first isolated network 322, second isolated network 210 and the Mth isolated network 328 are physically disconnected from all outside or external networks. In one embodiment, each one of first isolated network 104, second isolated network 310 and the Nth isolated network 316, and each one of first isolated network 322, second isolated network 210 and the Mth isolated network 328 are physically disconnected from all outside or external networks such that they each may be considered an "air-gapped" network.

In the illustrated embodiment, network switch 124 can be activated by network switch controller 126 via connection 128 to connect the primary network 102 to any one of first isolated network 104, second isolated network 310 or the Nth isolated network 316, or to any one of first isolated network 322, second isolated network 210 or the Mth isolated network 328. Network switch 124 can be deactivated via network switch controller 126 to disconnect the primary network 102 from any one of first isolated network 104, second isolated network 310 or the Nth isolated network 316, or any one of first isolated network 322, second isolated network 210 or the Mth isolated network 328. When deactivated, first isolated network 104, second isolated network 310 and the Nth isolated network 316, and the first isolated network 322, second isolated network 210 and the Mth isolated network 328 are disconnected from all outside or external networks.

Figure 6:
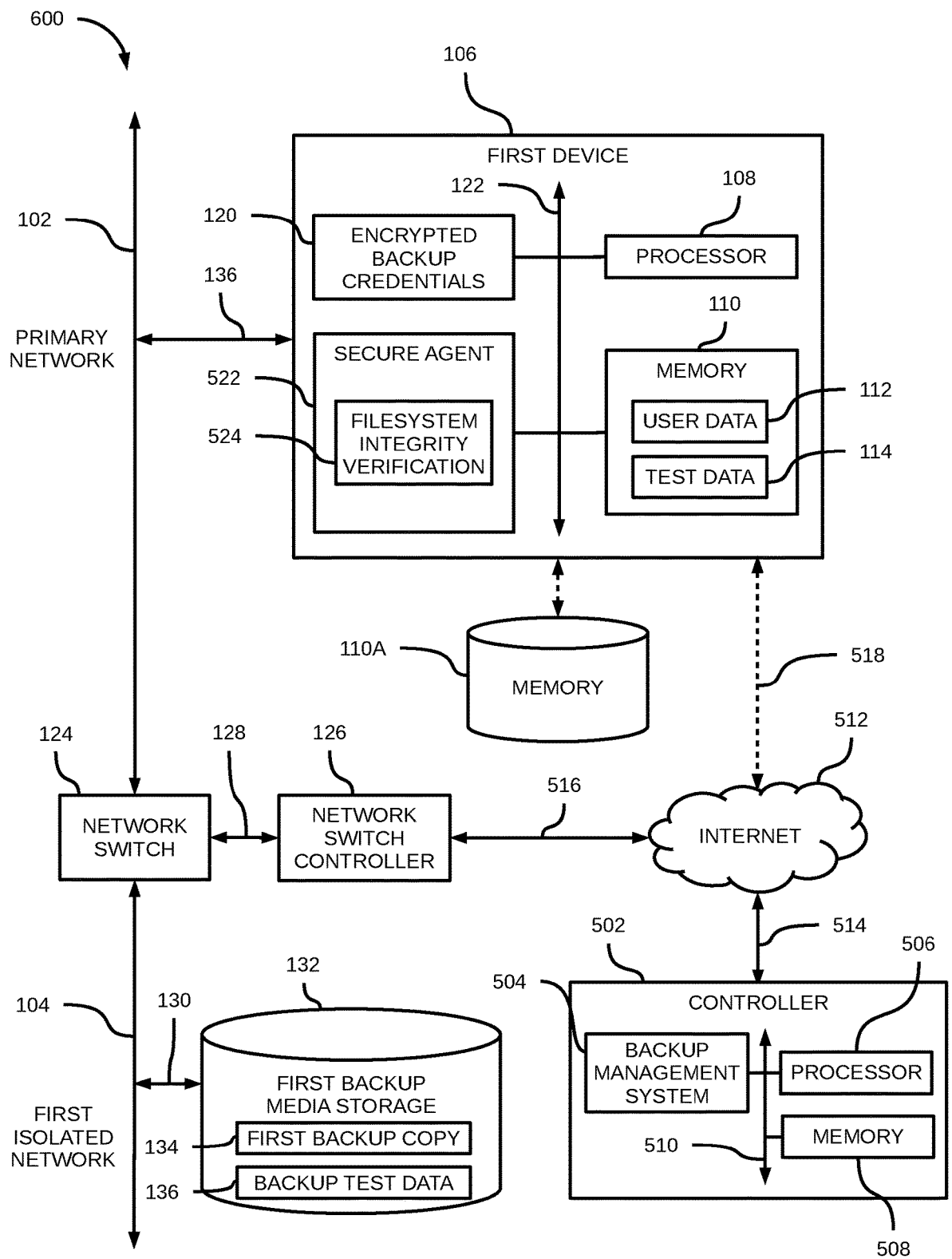
FIG. 6 illustrates a diagram of an embodiment of a backup management system that includes a primary network and a first isolated network.

FIG. 6 illustrates a diagram at 600 of an embodiment of a backup management system that includes a primary network 102 and a first isolated network 104. FIG. 6 illustrates an embodiment of FIG. 5 where I is an integer that is equal to or greater than 1 and N is an integer that is equal to or greater than 1. While only first device 106 is illustrated in FIG. 6, it is understood that the description for FIG. 6 can include any suitable number of devices including second device 304 and the Ith device 308 when I is an integer that is greater than 1. While only first backup media storage device 132 is illustrated in FIG. 6, it is understood that the description for FIG. 6 can include any suitable number of N backup media storage devices including second backup media storage device 314 and the Nth backup media storage device 320 when N is an integer that is greater than 1.

A controller 502 includes backup management system 504 and is coupled to and in communication with network switch controller 126 via an internet connection at 512 and connections 514 and 516. Backup management system 504 is in communication with secure agent 522 on first device 106, second device 304 and the Ith device 308 via the internet connection 512 and may communicate with the secure agent 522 via primary network 102 or via any suitable wired or wireless connection as illustrated at 518. Backup management system 504 is connected to at least one processor 506 and to at least one memory 508 via a bus 510. The at least one memory 508 stores program instructions that when executed by the at least one processor 506 causes backup management system 504 to perform backup process as described herein. Backup management system 504 executes the backup process and processes through a secure agent 522. In the illustrated embodiment, secure agent 522 is a software agent or software instructions stored on the at least one memory 110 that functions as an agent for backup management system 504. Backup management system 504 executes the backup process and processes on first device 106, second device 304 and the Ith device 308 via secure agent 522 by causing the secure agent 522 to execute script or software instructions stored in the at least one memory 110 by the at least one processor 108.

First device 106, second device 304 and the Ith device 308 each include the at least one processor 108 and the at least one memory 110. Memory 110 stores user data 112 and test data 114. In other embodiments, user data 112 and/or test data 114 may optionally be stored in memory 110A that is external to any of first device 106, second device 304 or the Ith device 308.

In various embodiments, backup management system 504 has read-only access to user data 112, has read-only access to both user data 112 and test data 114, or has read-only access to all data stored on memory 110. In one embodiment, backup management system 504 has read-only access to the N backup media storage devices (first backup media storage device 132, second backup media storage device 314 and the Nth backup media storage device 320), and read-only access to the M backup media storage devices (first backup media storage device 326, second backup media storage device 214 and the Mth backup media storage device 342). First device 106, second device 304 and the Ith device 308 each may include one or more user input devices such as a keyboard, mouse, touchscreen, microphone, etc., to accept user input and may also include a display to provide a visual output to a user.

In the illustrated embodiment, first device 106, second device 304 and the Ith device 308 each include encrypted backup credentials at 120. Encrypted backup credentials 120 represents an authorization utility used to authenticate an authorized backup user using encrypted credentials at 120. The authorized backup user is an account on first device 106, second device 304 and the Ith device 308 that has read-only access to user data 112 stored on memory 110 on the respective first device 106, second device 304 and the Ith device 308. In one embodiment, the authorized backup user is an account on first device 106, second device 304 and the Ith device 308 that has read-only access to the N backup media storage devices (first backup media storage device 132, second backup media storage device 314 and the Nth backup media storage device 320), and read-only access to the M backup media storage devices (first backup media storage device 326, second backup media storage device 214 and the Mth backup media storage device 342). The account on first device 106, second device 304 and the Ith device 308 can be a Windows account for Windows software installed on first device 106, second device 304 and the Ith device 308. The Windows account may be a local Windows account or a remote Windows account. The Windows account can also be a Microsoft Windows account or a Windows Live ID account. The account on first device 106, second device 304 and the Ith device 308 may also be a Linux account for Linux software installed on first device 106, second device 304 and the Ith device 308. In other embodiments, other suitable accounts can be used.

In the illustrated embodiment, user data 112 and test data 114 are files and folders stored on memory 110. Test data 114 represents files and folders that are "sprinkled" through the backup source which is memory 110 and reside in different memory and/or file locations. The test data 114 files are files that should not be edited or changed unless primary network 102 and/or first device 106 have been infected by malware, a computer virus, a trojan-horse, hacker, or other malicious code infection. Test data 114 files may be located in a top-level directory and in different folders. For example, in the top-level directory, the test data 114 files are designated by first, middle and last file names, and the test data 114 files are in folders having the same file names and are in files within these folders as well. The test data 114 files are small in size, and in various embodiments take up less than 10 kilobytes of space within memory 110, or take up less than 7 kilobytes of space within memory 110. In one embodiment, the test data files 114 are backed up along with the user data 112 or user data 112 files by backup management system 504 as described herein. In another embodiment, the test data files 114 are not backed up and only user data 112 or user data 112 files are backed by backup management system 504 as described herein.

In the illustrated embodiment, backup management system 504 operates or controls network switch controller 126 to activate or deactivate network switch 124. First backup media storage device 132 is connected to first isolated network 104 via a connection at 130. If network switch 124 is activated to connect the primary network 102 to the first isolated network 104, first backup media storage device 132 is accessible by first device 106 via primary network 102. If network switch 124 is deactivated to disconnect the primary network 102 from the first isolated network 104, then first isolated network 104 and first backup media storage device 132 are disconnected from all outside or external networks including primary network 102.

In one embodiment, I and N are integers that are equal to or greater than 1. Backup management system 504 performs a backup process or method for each one of N backup media storage devices. The backup process or method for each one of the N backup media storage devices includes backing up the I devices on primary network 102 to a same one of first backup media storage device 132, second backup media storage device 314 or the Nth backup media storage device 320, or to different ones of first backup media storage device 132, second backup media storage device 314 or the Nth backup media storage device 320. The backup process can be completed for first device 106 if I is equal to 1, or for any suitable number of devices that may include first device 106, second device 304, and the Ith device 308 if I is greater than 1. The backup process for first device 106, second device 304, and the Ith device 308 can be completed in parallel, serially, or in any suitable order.

Referring to FIG. 6, the backup process performed by backup management system 504 is described with respect to first device 106 and first backup media storage device 132. In the illustrated embodiment, the same backup process described for first device 106 can be used for second device 304 and the Ith device 308. The same backup process described for first backup media storage device 132 can also be used for second backup media storage device 314 and Nth backup media storage device 320. In the illustrated embodiments, one or more non-transitory, computer-readable storage media, store program instructions or script that when executed on or across one or more computing devices each having at least one processor causes the one or more computing devices to perform the backup process or method as described herein. In the illustrated embodiment, backup management system 504 performs the backup process or method as described herein via secure agent 522 by executing program instructions stored on the at least one memory 508 by the at least one processor 506.

The backup process includes backup management system 504, prior to a first time period, performing filesystem integrity verification 522 as a filesystem integrity test on test data 114 stored in memory 110 on first device 106 to obtain a baseline test result. The baseline test result is a baseline hash result obtained by applying a secure hashing algorithm (SHA) to the test data prior to a first time period. In various embodiments, the SHA applied can be any suitable SHA which is a cryptographic hash function which takes an input (e.g. test data 114) and produces a hash result (also known as a message digest). Examples include, but are not limited to SHA-1, SHA-2 and SHA-3 hash algorithms. In other embodiments, different secure hashing algorithms can be used.

The backup process includes backup management system 504 activating network switch 124 to connect primary network 102 to an isolated network associated with one of the N backup media storage devices. The N isolated networks include first isolated network 104, second isolated network 310 and the Nth isolated network 316. For the embodiment illustrated in FIG. 6, the isolated network associated with one of the N backup media storage devices is first isolated network 104. The backup process includes backup management system 504 storing a first backup copy 134 of user data 112 stored on first device 106 on the one of the N backup media storage devices. For the embodiment illustrated in FIG. 6, the one of the N backup media storage devices is first backup media storage device 132.

In the illustrated embodiment, the type of backup can include, but is not limited to, a file backup, a database backup, or a backup or copy of a system state or image. In one embodiment, only information within user data 112 that has changed since a previous backup is stored as the first backup copy 134 on the first backup media storage device 132. This may apply for a file backup. In other embodiments, with virtual machine, database or image backups, all user data 112 stored within memory 110 may be backed up and stored as the first backup copy 134 on the first backup media storage device 132. In the illustrated embodiment, a first backup copy 134 is stored over a first time period that begins when backup management system 504 initiates or executes the storing of the first backup copy 134, and ends when the storing of the first backup copy 134 by backup management system 504 is completed.

The backup process includes backup management system 504, during the first time period, continuously verifying an integrity of test data 114 by performing filesystem integrity tests on test data 114 to determine if a result of any of the filesystem integrity tests does not match the baseline test result which was obtained prior to the first time period. Determining if a result of any of the filesystem integrity tests does not match the baseline test result includes, for each one of the filesystem integrity tests, applying the secure hashing algorithm to the test data 114 to obtain a hash result for the test data 114, and comparing the hash result for the test data 114 to the baseline test result or baseline hash result to determine if the hash result for the test data 114 matches the baseline hash result. The baseline hash result is obtained by applying the secure hashing algorithm to the test data 114 prior to the first time period. The filesystem integrity tests performed on test data 114 utilize the same secure hashing algorithm that was used to obtain the baseline hash result. In other embodiments, different secure hashing algorithms can be used.

In some embodiments, performing the filesystem integrity tests on the test data 114 and storing the first backup copy 134 on the one of the N backup media storage devices or the first backup media storage device 132 includes backup management system 504 having read-only access to user data 112 and test data 114 stored on first device 106, and having read-only access to the one of the N backup media storage devices. The one of the N backup media storage devices can include first backup media storage device 132, second backup media storage device 314, and the Nth backup media storage device 320.

In some embodiments, backup management system 504 determines if the test data 114 or the test data 114 files exist before performing filesystem integrity tests on test data 114. The importance of checking if the files exist may be based on the potential of ransomware changing the name of any of the test data 114 files. In some embodiments, backup management system 504, either before or at the beginning of the first time period and before performing a first one of the filesystem integrity tests on test data 114, determines if the test data 114 or the test data 114 files exist. In some embodiments, if any of the test data 114 file names do not exist, backup management system 504 stops storing the first backup copy 134 of user data 112, or the first backup copy 134 of user data 112 and test data 114, on the first backup media storage device 132. In some embodiments, if any of the test data 114 file names do not exist, backup management system 504 immediately deactivates network switch 124 via network switch controller 126 in order to isolate the first isolated network 104 and first backup media storage device 132 from all outside networks including the primary network 102. In some embodiments, if any of the test data 114 file names do not exist, backup management system 504 sends out an alert or notification via email or text messages to first device 106 or to a network administrator of primary network 102. If the test data 114 or the test data 114 files do exist, backup management system 504, during the first time period, continuously verifies an integrity of test data 114 by performing filesystem integrity tests on test data 114 to determine if a result of any of the filesystem integrity tests does not match the baseline test result which was obtained prior to the first time period. In one embodiment, backup management system 504 continuously verifying the integrity of test data 114 includes simultaneously performing the filesystem integrity tests on test data 114 and storing the first backup copy 134 of user data 112 on the first backup media storage device 132 during the first time period.

The backup process includes backup management system 504, during the first time period, deactivating network switch 124 via network switch controller 126 if the result of any of the filesystem integrity tests performed on test data 114 do not match the baseline test result or baseline hash result in order to isolate the one of the N backup media storage devices (first backup media storage device 132 illustrated in FIG. 6) and the isolated network (first isolated network 104 illustrated in FIG. 6) associated with the one of the N backup media storage devices (first backup media storage device 132 illustrated in FIG. 6) from all outside networks including the primary network 102. The backup process includes backup management system 504, at the end of the first time period, deactivating network switch 124 via network switch controller 126 if the result of all of the filesystem integrity tests performed on test data 114 each match the baseline test result or baseline hash result in order to isolate the one of the N backup media storage devices (first backup media storage device 132 illustrated in FIG. 6) and the isolated network (first isolated network 104 illustrated in FIG. 6) associated with the one of the N backup media storage devices (first backup media storage device 132 illustrated in FIG. 6) from all outside networks including the primary network 102.

In the illustrated embodiment, backup management system 504 may send logs and/or alerts via email or text messages before, during and after the first time period. For example, backup management system 504 may send logs and/or alerts via email or text messages to first device 106 or to a network administrator of primary network 102 if the result of any of the filesystem integrity tests performed on test data 114 does not match the baseline test result or baseline hash result. Backup management system 504 may send logs and/or alerts via email or text messages to first device 106 or to a network administrator of primary network 102 if any of the test data 114 file names do not exist. Backup management system 504 may send logs and/or alerts via email or text messages to first device 106 or to a network administrator of primary network 102 at the end of the first time period when the storing of the first backup copy 134 is completed. Backup management system 504 may send logs and/or alerts via email or text messages to first device 106 or to a network administrator of primary network 102 if backup management system 504 deactivates the network switch 124 to isolate any one of the first backup media storage device 132, the second backup media storage device 214, or the Nth backup media storage device 318, as well as the isolated network associated with the one of the N backup media storage devices.

Backup management system 504 may retrieve usage data from any one of the N backup media storage devices in order to optimize or minimize the first time period or data storage usage efficiency when storing the first backup copy 134 of user data 112 on first backup media storage device 132, or on any of the N backup media storage devices. Backup management system 504 may delete data stored on any one of the first backup media storage device 132, the second backup media storage device 314, or the Nth backup media storage device 320, that is older than a retention period that is configured or identified within program instructions stored on memory 508.

The backup process performed by backup management system 504 with respect to first device 106 can be performed on a repeating or cyclic basis using a cyclic backup method or process as described with respect to FIG. 9. In this embodiment, performing the backup process for each one of the N backup media storage devices comprises performing the backup process for each one the N backup media storage devices at different points in time or successive time intervals for a set of N successive times, wherein N is greater than 1. The set of the N successive times corresponds to a backup cycle for first device 106 and the N backup media storage devices. In the illustrated embodiment, the backup cycle may be a repeating backup cycle.

Figure 7:
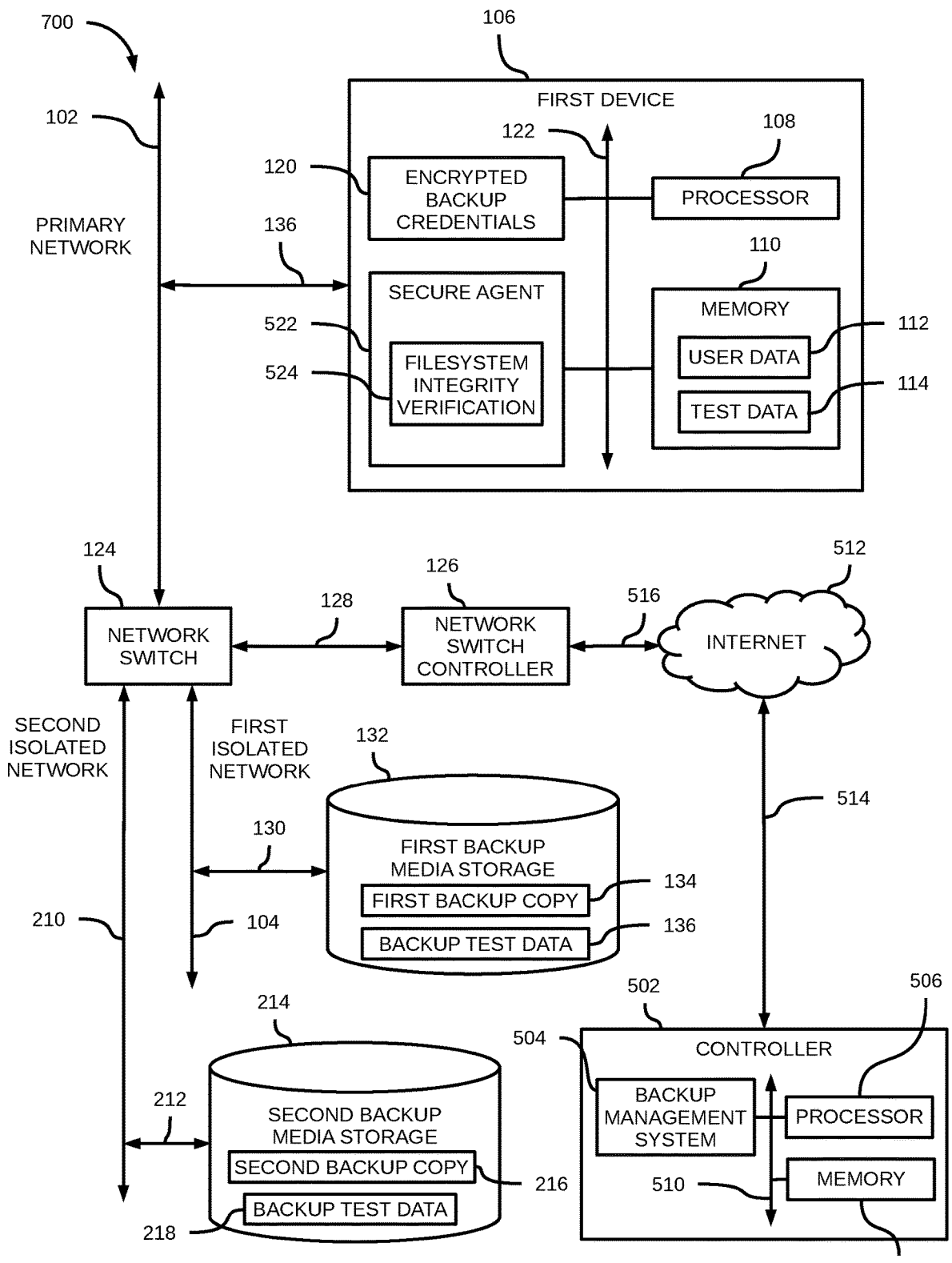
FIG. 7 illustrates a diagram of an embodiment of a backup management system that includes a primary network, a first isolated network and a second isolated network.

FIG. 7 illustrates a diagram at 700 of an embodiment of a backup management system that includes a primary network 102, a first isolated network 104 and a second isolated network 210. FIG. 7 illustrates embodiments of FIG. 5 where I is an integer that is equal to or greater than 1, M is an integer that is equal to or greater than 1 and N is an integer that is equal to or greater than 1. While only first device 106 is illustrated in FIG. 7, it is understood that the description for FIG. 7 can include any suitable number of devices including second device 304 and the Ith device 308 when I is an integer that is greater than 1.

Backup management system 504 performs a backup process or method for each one of M backup media storage devices that includes backing up any one or more of the N backup media storage devices (e.g., first backup media storage device 132, second backup media storage device 314 or the Nth backup media storage device 320), to any one or more of the M backup media storage devices (e.g., first backup media storage device 326, second backup media storage device 214 or the Mth backup media storage device 342).

In another embodiment, backup management system 504 performs a backup process or method for each one of M backup media storage devices that includes backing up any one or more of the M backup media storage devices (e.g., first backup media storage device 326, second backup media storage device 214 or the Mth backup media storage device 342), to any other one or more of the M backup media storage devices (e.g., first backup media storage device 326, second backup media storage device 214 or the Mth backup media storage device 342).

In the illustrated embodiment, the first backup copy 134 of user data 112 and backup test data 136 are files and folders stored on first backup media storage device 132 that can also be stored on other ones of the N backup media storage devices. The second backup copy 216 and backup test data 218 are files and folders stored on second backup media storage device 214 that can also be stored on other ones of the M backup media storage devices. Backup test data 136 and backup test data 218 represent files and folders that are "sprinkled" through the backup source which are respectively first backup media storage device 132 or the second backup media storage device 214, and that reside in different memory and/or file locations. The backup test data 136 and backup test data 218 files are files that should not be edited or changed unless first isolated network 104 and first backup media storage device 132, or second isolated network 210 and second backup media storage device 214, have been infected by malware, a computer virus, a trojan-horse, hacker, or other malicious code infection. Backup test data 136 and backup test data 218 files may be located in a top-level directory and in different folders. For example, in the top-level directory, the backup test data 136 files and the backup test data 218 files are designated by first, middle and last file names, and the backup test data 136 files and the backup test data 218 files are in folders having the same file names and are in files within these folders as well. The backup test data 136 files and the backup test data 218 files are small in size, and in various embodiments take up less than 10 kilobytes of space within, respectively, first backup media storage device 132 and second backup media storage device 214, or may take up less than 7 kilobytes of space within, respectively, first backup media storage device 132 and second backup media storage device 214. In one embodiment, the backup test data 136 files and the backup test data 218 files are backed up along with, respectively, the first backup copy 134 and the second backup copy 216 by backup management system 504 as described herein. In another embodiment, the backup test data 136 files and the backup test data 218 files are not backed up and only the first backup copy 134 and the second backup copy 216 are backed up by backup management system 504 as described herein.

The backup process performed by backup management system 504 in first device 106 is described with respect to first backup media storage device 132 and second backup media storage device 214. The backup process performed by backup management system 504 can also be performed for each one of M backup media storage devices, wherein M is an integer that is equal to or greater than 1. On one embodiment, the backup process performed by backup management system 504 with respect to FIG. 7 is performed after the backup process described with respect to FIG. 6.

In the illustrated embodiments, one or more non-transitory, computer-readable storage media, store program instructions or script that when executed on or across one or more computing devices each having at least one processor causes the one or more computing devices to perform the backup process or method as described herein. In the illustrated embodiment, backup management system 504 performs the backup process or method as described herein by executing program instructions or script stored on the at least one memory 508 by the at least one processor 506.

The backup process includes backup management system 504, prior to a second time period, performing filesystem integrity verification as a filesystem integrity test on backup test data 136 stored on the one of the N backup media storage devices which is first backup media storage device 132 to obtain a first backup baseline test result. The first backup baseline test result is a first backup baseline hash result obtained by applying a secure hashing algorithm (SHA) to the backup test data 136 prior to a second time period. In various embodiments, the SHA applied can be any suitable SHA which is a cryptographic hash function which takes an input (e.g. backup test data 136) and produces a hash result (also known as a message digest). Examples include, but are not limited to SHA-1, SHA-2 and SHA-3 hash algorithms. In other embodiments, any suitable hash algorithm can be used.

The backup process includes backup management system 504 activating network switch 124 to connect the isolated network (first isolated network 104 illustrated in FIG. 7) associated with the one of the N backup media storage devices (first backup media storage device 132 illustrated in FIG. 7), to an isolated network (second isolated network 210 illustrated in FIG. 7) associated with one of the M backup media storage devices (second backup media storage device 214 illustrated in FIG. 7). The backup process includes backup management system 504 storing a second backup copy 216 of the first backup copy 134 stored on the one of the N backup media storage devices (first backup media storage device 132 illustrated in FIG. 7) on the one of the M backup media storage devices (second backup media storage device 214 illustrated in FIG. 7).

In the illustrated embodiment, the type of backup can include, but is not limited to, a file backup, a database backup, or a backup or copy of a system state or image. In one embodiment, only information within first backup copy 134 that has changed since a previous backup is stored as the second backup copy 216 on the second backup media storage device 214. This may apply for a file backup. In other embodiments, with virtual machine, database or image backups, all of the first backup copy 134 stored on first backup media storage device 132 is backed up and stored as the second backup copy 216 on the second backup media storage device 214. In the illustrated embodiment, the second backup copy 216 is stored over a second time period that begins when backup management system 504 initiates or executes the storing of the second backup copy 216, and ends when the storing of the second backup copy 216 by backup management system 504 is completed.

The backup process includes backup management system 504, during the second time period, continuously verifying an integrity of backup test data 136 by performing filesystem integrity tests on backup test data 136 to determine if a result of any of the filesystem integrity tests does not match the first backup baseline test result which was obtained prior to the second time period. Determining if a result of any of the filesystem integrity tests does not match the first backup baseline test result includes, for each one of the filesystem integrity tests, applying the secure hashing algorithm to the backup test data 136 to obtain a hash result for the backup test data 136, and comparing the hash result for the backup test data 136 to the first backup baseline test result or first backup baseline hash result to determine if the hash result for the backup test data 136 matches the first backup baseline hash result. The first backup baseline hash result is obtained by applying the secure hashing algorithm to the backup test data 136 prior to the second time period. The filesystem integrity tests performed on backup test data 136 utilize the same secure hashing algorithm that was used to obtain the first backup baseline hash result. In other embodiments, different secure hashing algorithms can be used.

In some embodiments, performing the filesystem integrity tests on the backup test data 136 and storing the second backup copy 216 on the one of the M backup media storage devices or the second backup media storage device 214 as illustrated in FIG. 7 includes backup management system 504 having read-only access to first backup copy 134 and backup test data 136 stored on first backup media storage device 132, having read-only access to second backup media storage device 214, and having read-only access to other ones of the N backup media storage devices and other ones of the M backup media storage devices (see also, FIG. 5).

In some embodiments, backup management system 504 determines if the backup test data 136 or the backup test data 136 files exist before performing filesystem integrity tests on backup test data 136. The importance of checking if the files exist may be based on the potential of ransomware changing the name of any of the backup test data 136 files. In some embodiments, backup management system 504, either before or at the beginning of the second time period and before performing a first one of the filesystem integrity tests on backup test data 136, determines if the backup test data 136 or the backup test data 136 files exist. In some embodiments, if any of the backup test data 136 file names do not exist, backup management system 504 stops storing the second backup copy 216 of the first backup copy 134 on second backup media storage device 214. In some embodiments, if any of the backup test data 136 file names do not exist, backup management system 504 immediately deactivates network switch 124 via network switch controller 126 in order to isolate the one of the M backup media storage devices (second backup media storage device 214 illustrated in FIG. 7) and the isolated network (second isolated network 210 illustrated in FIG. 7) that is associated with one of the M backup media storage devices (second backup media storage device 214 illustrated in FIG. 7), from all of the outside networks including the primary network 102 and the isolated network (first isolated network 104 illustrated in FIG. 7) associated with the one of the N backup media storage devices (first backup media storage device 132 illustrated in FIG. 7). In some embodiments, if any of the backup test data 136 file names do not exist, backup management system 504 sends out an alert or notification via email or text messages to first device 106 or to a network administrator of primary network 102. If the backup test data 136 or the backup test data 136 files do exist, backup management system 504, during the second time period, continuously verifies an integrity of backup test data 136 by performing filesystem integrity tests on backup test data 136 to determine if a result of any of the filesystem integrity tests does not match the first backup baseline test result which was obtained prior to the second time period. In one embodiment, backup management system 504 continuously verifying the integrity of backup test data 136 includes simultaneously performing the filesystem integrity tests on backup test data 136 and storing the second backup copy 216 on the second backup media storage device 214.

In the illustrated embodiment, the backup process includes backup management system 504, during the second time period, deactivating network switch 124 via network switch controller 126 if the result of any of the filesystem integrity tests performed on backup test data 136 do not match the first backup baseline test result or first backup baseline hash result in order to isolate the one of the M backup media storage devices (second backup media storage device 214 illustrated in FIG. 7) and the isolated network (second isolated network 210 illustrated in FIG. 7) that is associated with one of the M backup media storage devices (second backup media storage device 214 illustrated in FIG. 7), from all of the outside networks including the primary network 102 and the isolated network (first isolated network 104 illustrated in FIG. 7) associated with the one of the N backup media storage devices (first backup media storage device 132 illustrated in FIG. 7).

The backup process includes backup management system 504, at the end of the second time period, deactivating network switch 124 via network switch controller 126 if the result of all of the filesystem integrity tests performed on backup test data 136 each match the first backup baseline test result or the first backup baseline hash result in order to isolate the one of the M backup media storage devices (second backup media storage device 214 illustrated in FIG. 7) and the isolated network (second isolated network 210 illustrated in FIG. 7) that is associated with one of the M backup media storage devices (second backup media storage device 214 illustrated in FIG. 7), from all of the outside networks including the primary network 102 and the isolated network (first isolated network 104 illustrated in FIG. 7)

associated with the one of the N backup media storage devices (first backup media storage device 132 illustrated in FIG. 7).

The backup process described above for the one of the M backup media storage devices (e.g., second backup media storage device 214 illustrated in FIG. 7) of storing the first backup copy 134 stored on the one of the N backup media storage devices (e.g., first backup media storage device 132) as a second backup copy 216 on the one of the M backup media storage devices (e.g., second backup media storage device 214 illustrated in FIG. 7) can be repeated in a cascading backup method using the same backup process illustrated in FIG. 7 (see also, FIG. 10). For example, the second backup copy 216 stored on the one of the M backup media storage devices can be stored as a third backup copy on another one of the M or N backup media storage devices. The third backup copy stored on the another one of the M or N backup media storage devices can be stored as a fourth backup copy on yet another one of the M or N backup storage devices.

An embodiment of using the cascading backup method is described with respect to FIG. 7 for storing a second backup copy 216 that is stored on one of the M backup media storage devices (second backup media storage device 214 illustrated in FIG. 7) as a third backup copy on another one of the M backup media storage devices (e.g., first backup media storage device 326 illustrated in FIG. 5). The backup process includes backup management system 504, prior to a third time period, performing a filesystem integrity verification as a filesystem integrity test on backup test data 218 stored on the one of the M backup media storage devices (second backup media storage device 214 illustrated in FIG. 7) to obtain a second backup baseline test result. The second backup baseline test result is a second backup baseline hash result obtained by applying the secure hashing algorithm (SHA) to the backup test data 218 prior to the third time period. In various embodiments, the SHA applied can be any suitable SHA which is a cryptographic hash function which takes an input (e.g. backup test data 218) and produces a hash result (also known as a message digest). Examples include, but are not limited to SHA-1, SHA-2 and SHA-3 hash algorithms. In other embodiments, other suitable hash algorithms can be used.

The backup process includes backup management system 504 activating network switch 124 to connect the isolated network (second isolated network 210 illustrated in FIG. 5 and FIG. 7) associated with the one of the M backup media storage devices (second backup media storage device 214 illustrated in FIG. 5 and FIG. 7), to an isolated network (first isolated network 322 illustrated in FIG. 5) associated with another one of the M backup media storage devices (first backup media storage device 326 illustrated in FIG. 5). The backup process includes backup management system 504 storing a third backup copy of the second backup copy 216 stored on the one of the M backup media storage devices (second backup media storage device 214 illustrated in FIG. 5 and FIG. 7) on the another one of the M backup media storage devices (first backup media storage device 326 illustrated in FIG. 5). The third backup copy is stored over a third time period that begins when backup management system 504 initiates or executes the storing of the third backup copy and ends when the storing of the third backup copy by backup management system 504 is completed.

The backup process includes backup management system 504, during the third time period, continuously verifying an integrity of backup test data 218 by performing filesystem integrity tests on backup test data 218 to determine if a result of any of the filesystem integrity tests does not match the second backup baseline test result which was obtained prior to the third time period. Determining if a result of any of the filesystem integrity tests does not match the second backup baseline test result includes, for each one of the filesystem integrity tests, applying the secure hashing algorithm to the backup test data 218 to obtain a hash result for the backup test data 218, and comparing the hash result for the backup test data 218 to the second backup baseline test result or second backup baseline hash result to determine if the hash result for the backup test data 218 matches the second backup baseline hash result. The second backup baseline hash result is obtained by applying the secure hashing algorithm to the backup test data 218 prior to the third time period. The filesystem integrity tests performed on backup test data 218 utilize the same secure hashing algorithm that was used to obtain the second backup baseline hash result. In other embodiments, different secure hashing algorithms can be used.

The backup process includes backup management system 504, during the third time period, deactivating network switch 124 via network switch controller 126 if the result of any of the filesystem integrity tests performed on backup test data 218 do not match the second backup baseline test result or second backup baseline hash result in order to isolate the another one of the M backup media storage devices (first backup media storage device 326 illustrated in FIG. 5) and the isolated network (first isolated network 322 illustrated in FIG. 5) associated with the another one of the M backup media storage devices (first backup media storage device 326 illustrated in FIG. 5) from all outside networks including the primary network 102, the isolated network (second isolated network 210 illustrated in FIG. 5 and FIG. 7) associated with the one of the M backup media storage devices (second backup media storage device 214 illustrated in FIG. 5 and FIG. 7) and the isolated network (first isolated network 104 illustrated in FIG. 5 and FIG. 7) associated with the one of the N backup media storage devices (first backup media storage device 132 illustrated in FIG. 5 and FIG. 7).

The backup process includes backup management system 504, at the end of the third time period, deactivating network switch 124 via network switch controller 126 if the result of all of the filesystem integrity tests performed on backup test data 218 each match the second backup baseline test result or the second backup baseline hash result in order to isolate the another one of the M backup media storage devices (first backup media storage device 326 illustrated in FIG. 5) and the isolated network (first isolated network 322 illustrated in FIG. 5) associated with the another one of the M backup media storage devices (first backup media storage device 326 illustrated in FIG. 5) from all outside networks including the primary network 102, the isolated network (second isolated network 210 illustrated in FIG. 5 and FIG. 7) associated with the one of the M backup media storage devices (second backup media storage device 214 illustrated in FIG. 5 and FIG. 7) and the isolated network (first isolated network 104 illustrated in FIG. 5 and FIG. 7) associated with the one of the N backup media storage devices (first backup media storage device 132 illustrated in FIG. 5 and FIG. 7).

In some embodiments, the second time period and the third time period at least partially overlap in time. In some embodiments, the first time period, the second time period and the third time period at least partially overlap in time. In other embodiments the second time period and the third time period, or the first time period, the second time period and the third time period do not overlap in time.

Figure 8:
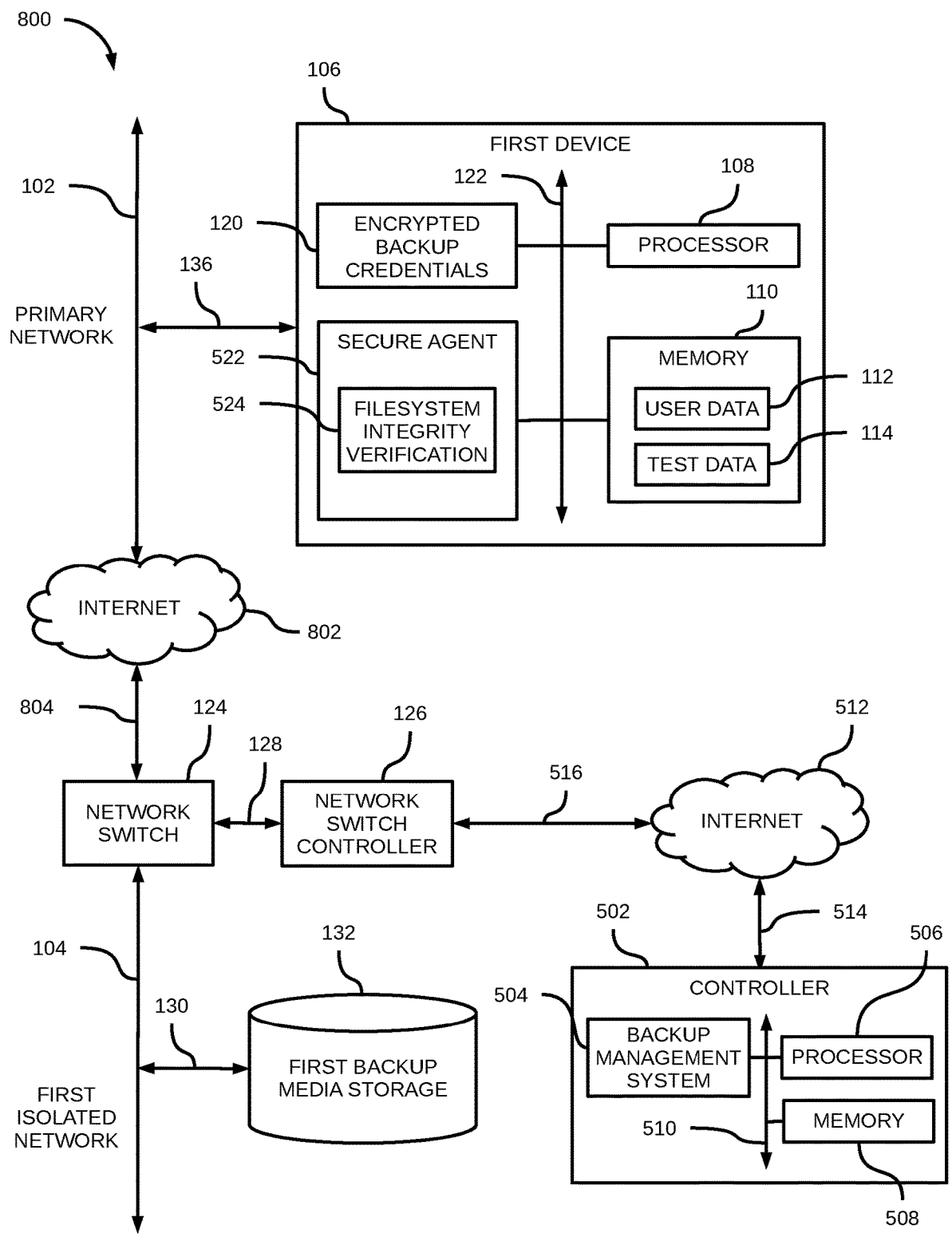
FIG. 8 illustrates a diagram of an alternative embodiment of the backup management system illustrated in FIGS. 5-7.

FIG. 8 illustrates a diagram at 800 of an embodiment of the backup management system illustrated in FIGS. 5-7 where primary network 102 is connected via an internet connection or cloud-based connection illustrated at 802 to first network switch 124 via connection 804.

FIG. 9 illustrates a diagram at 900 of an embodiment of a cyclic backup method or process. In an embodiment where first device 106 is backed up to each one of the N backup media storage devices, the cyclic backup process is illustrated at 902. In the illustrated embodiment, N is an integer that is equal to or greater than 2. The device being backed up can include any of the I devices (first device 106, second device 304 and the Ith device 308), where I is an integer that is equal to or greater than 1. If the different points in time or successive time intervals are one day each or are spaced apart by one day, where N is greater than 3, the backup process performed by backup management system 116 or by backup management system 504 will back up the first device 106 to the first backup media storage device 132 (illustrated at 906) on the first day or day 1 as illustrated at 904. The backup process performed by backup management system 116 or by backup management system 504 will back up the first device 106 to the second backup media storage device 314 (illustrated at 910) on the second day or day 2 as illustrated at 908. The backup process performed by backup management system 116 or by backup management system 504 will back up the first device 106 to a third one of the N backup media storage devices illustrated at 914 on the third day or day 3 as illustrated at 912. The backup process performed by backup management system 116 or by backup management system 504 will back up the first device 106 to the Nth backup media storage device 320 (illustrated at 918) on the Nth day as illustrated at 916. With the cyclic backup method, for N backup media storage devices 320, after day N as illustrated at 916, the backup process may continue, as illustrated at 920, with backing up the first device 106 to the first backup media storage device 132 (illustrated at 906) on the N+1 day as illustrated at 904. In various embodiments, the first device 106 is backed up to each one of the N backup media storage devices in the same order or sequence as the previous cycle or can be backed up in a different or random order or sequence. In other embodiments, the different points in time or successive time intervals can be spaced apart by other suitable time increments, such as by one or more hours or one or more weeks.

FIG. 10 illustrates a diagram at 1000 of an embodiment of a cascading backup process or method. The method includes backup management system 116 or backup management system 504 backing up user data 112 on a first device 106 (illustrated at 1002) as a first backup copy 134 on a first backup media storage device 132 (illustrated at 1004). The method includes backup management system 116 or backup management system 504 backing up the first backup copy 134 on the first backup media storage device 132 (illustrated at 1004) as a second backup copy 216 on a second backup media storage device 214 (illustrated at 1006). The method includes backup management system 116 or backup management system 504 backing up the second backup copy 216 on the second backup media storage device 214 (illustrated at 1006) as an Nth backup copy on the Nth backup media storage device 320 or as an Mth backup copy on the Mth backup media storage device 342 (illustrated at 1008). M and N are integers that are equal to or greater than 2.

In one embodiment, backup management system 116 or backup management system 504 backing up user data 112 on a first device 106 (illustrated at 1002) as a first backup copy 134 on a first backup media storage device 132 (illustrated at 1004) occurs during a first time period as described with respect to FIG. 2 and FIG. 6. Backup management system 116 or backup management system 504 backing up the first backup copy 134 on the first backup media storage device 132 (illustrated at 1004) as a second backup copy 216 on a second backup media storage device 214 (illustrated at 1006) occurs during a second time period as described with respect to FIG. 3 and FIG. 7. Backup management system 116 or backup management system 504 backing up the second backup copy 216 on the second backup media storage device 214 (illustrated at 1006) as a third backup copy on the first backup media storage device 326 occurs during a third time period as described with respect to FIG. 3 and FIG. 7.

In some embodiments, the second time period and the third time period at least partially overlap in time. In some embodiments, the first time period, the second time period and the third time period at least partially overlap in time. In other embodiments the second time period and the third time period, or the first time period, the second time period and the third time period, do not overlap in time.

In one embodiment, a backup from first device 1002 to first backup media storage device 1004 occurs at a scheduled time when second backup media storage device 1006 and the Nth or Mth backup media storage 1008 are isolated from first backup media storage device 1004. A backup from first backup media storage device 1004 to second backup media storage device 1006 can occur immediately or at a later time, such as later in the same day after the backup from first device 1002 to first backup media storage device 1004. During each backup, all other ones of the first device 1002, the first backup media storage device 1004, the second backup media storage device 1006 and the Mth or Nth backup media storage device 1008 that are not involved with the backup are isolated from the two of the first device 1002, the first backup media storage device 1004, the second backup media storage device 1006 and the Mth or Nth backup media storage device 1008 that are participating in the backup.

Figure 11:
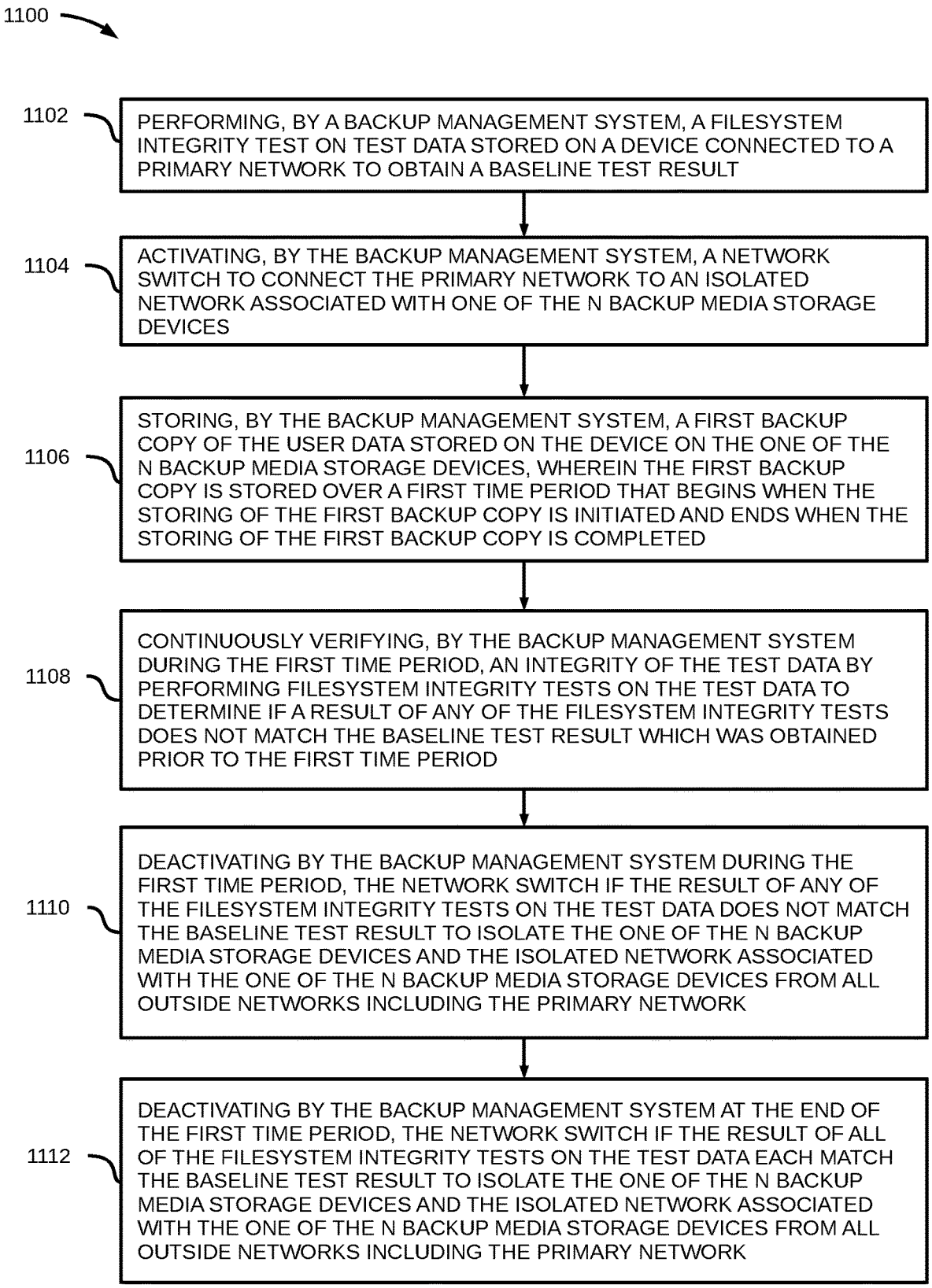
FIG. 11 illustrates a flowchart of an embodiment of a method of performing a backup.

FIG. 11 illustrates a flowchart at 1100 of an embodiment of a method of performing a backup. The method is illustrated at 1100. At 1102, the method includes performing, by a backup management system 116 or a backup management system 504, a filesystem integrity test on test data 114 stored on a device to obtain a baseline test result. The device can include any of the I devices (first device 106, second device 304 and the Ith device 308), where I is an integer that is equal to or greater than 1.

At 1104, the method includes activating, by the backup management system 116 or the backup management system 504, a network switch 124 to connect the primary network 102 to an isolated network associated with one of the N backup media storage devices. The isolated networks associated with the N backup media storage devices can include any of the N isolated networks (first isolated network 104, second isolated network 310 and the Nth isolated network 316), where N is an integer that is equal to or greater than 1. The N backup media storage devices can include any of the first backup media storage device 132, second backup media storage device 314 and the Nth backup media storage device 320, where N is an integer that is equal to or greater than 1.

At 1106, the method includes storing, by the backup management system 116 or the backup management system 504, a first backup copy of the user data 112 stored on the device on the one of the N backup media storage devices, wherein the first backup copy 134 is stored over a first time period that begins when the storing of the first backup copy 134 is initiated and ends when the storing of the first backup copy 134 is completed.

At 1108, the method includes continuously verifying, by the backup management system 116 or the backup management system 504 during the first time period, an integrity of the test data 114 by performing filesystem integrity tests on the test data 114 to determine if a result of any of the filesystem integrity tests does not match the baseline test result which was obtained prior to the first time period.

At 1110, the method includes deactivating, by the backup management system 116 or the backup management system 504 during the first time period, the network switch 124 if the result of any of the filesystem integrity tests on the test data 114 does not match the baseline test result to isolate the one of the N backup media storage devices and the isolated network associated with the one of the N backup media storage devices from all outside networks including the primary network 102.

At 1112, the method includes deactivating, by the backup management system 116 or the backup management system 504 at the end of the first time period, the network switch 124 if the result of all of the filesystem integrity tests on the test data 114 each match the baseline test result to isolate the one of the N backup media storage devices and the isolated network associated with the one of the N backup media storage devices from all outside networks including the primary network.

Figure 12:
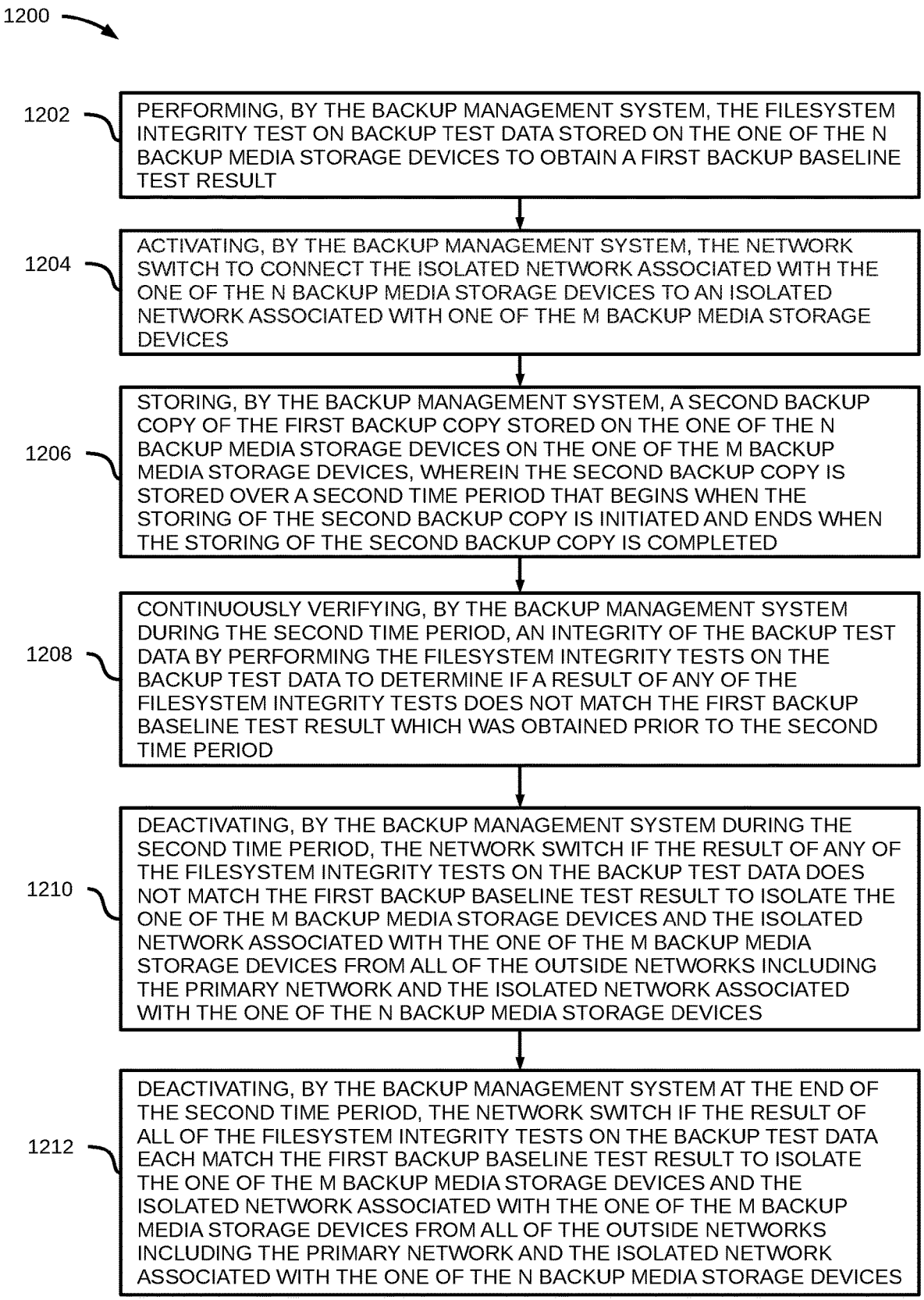
FIG. 12 illustrates a flowchart of an embodiment of a method of performing a backup.

FIG. 12 illustrates a flowchart at 1200 of an embodiment of a method of performing a backup. The method is illustrated at 1200. At 1202, the method includes performing, by the backup management system 116 or the backup management system 504, the filesystem integrity test on backup test data 136 stored on the one of the N backup media storage devices to obtain a first backup baseline test result. The N backup media storage devices can include any of the first backup media storage device 132, second backup media storage device 314 and the Nth backup media storage device 320, where N is an integer that is equal to or greater than 1.

At 1204, the method includes activating, by the backup management system 116 or the backup management system 504, the network switch 124 to connect the isolated network associated with the one of the N backup media storage devices to an isolated network associated with one of the M backup media storage devices. The isolated networks associated with the M backup media storage devices can include any of the M isolated networks (first isolated network 322, second isolated network 210 and the Mth isolated network 328), where M is an integer that is equal to or greater than 1. The M backup media storage devices can include any of the first backup media storage device 326, second backup media storage device 214 and the Mth backup media storage device 342, where M is an integer that is equal to or greater than 1.

At 1206, the method includes storing, by the backup management system 116 or the backup management system 504, a second backup copy 216 of the first backup copy 134 stored on the one of the N backup media storage devices on the one of the M backup media storage devices, wherein the second backup copy 216 is stored over a second time period that begins when the storing of the second backup copy 216 is initiated and ends when the storing of the second backup copy 216 is completed.

At 1208, the method includes continuously verifying, by the backup management system 116 or the backup management system 504 during the second time period, an integrity of the backup test data 136 by performing the filesystem integrity tests on the backup test data 136 to determine if a result of any of the filesystem integrity tests does not match the first backup baseline test result which was obtained prior to the second time period.

At 1210, the method includes deactivating, by the backup management system 116 or the backup management system 504 during the second time period, the network switch 124 if the result of any of the filesystem integrity tests on the backup test data 136 does not match the first backup baseline test result to isolate the one of the M backup media storage devices and the isolated network associated with the one of the M backup media storage devices from all of the outside networks including the primary network 102 and the isolated network associated with the one of the N backup media storage devices.

At 1212, the method includes deactivating, by the backup management system 116 or the backup management system 504 at the end of the second time period, the network switch 124 if the result of all of the filesystem integrity tests on the backup test data 136 each match the first backup baseline test result to isolate the one of the M backup media storage devices and the isolated network associated with the one of the M backup media storage devices from all of the outside networks including the primary network and the isolated network associated with the one of the N backup media storage devices.

Figure 13:
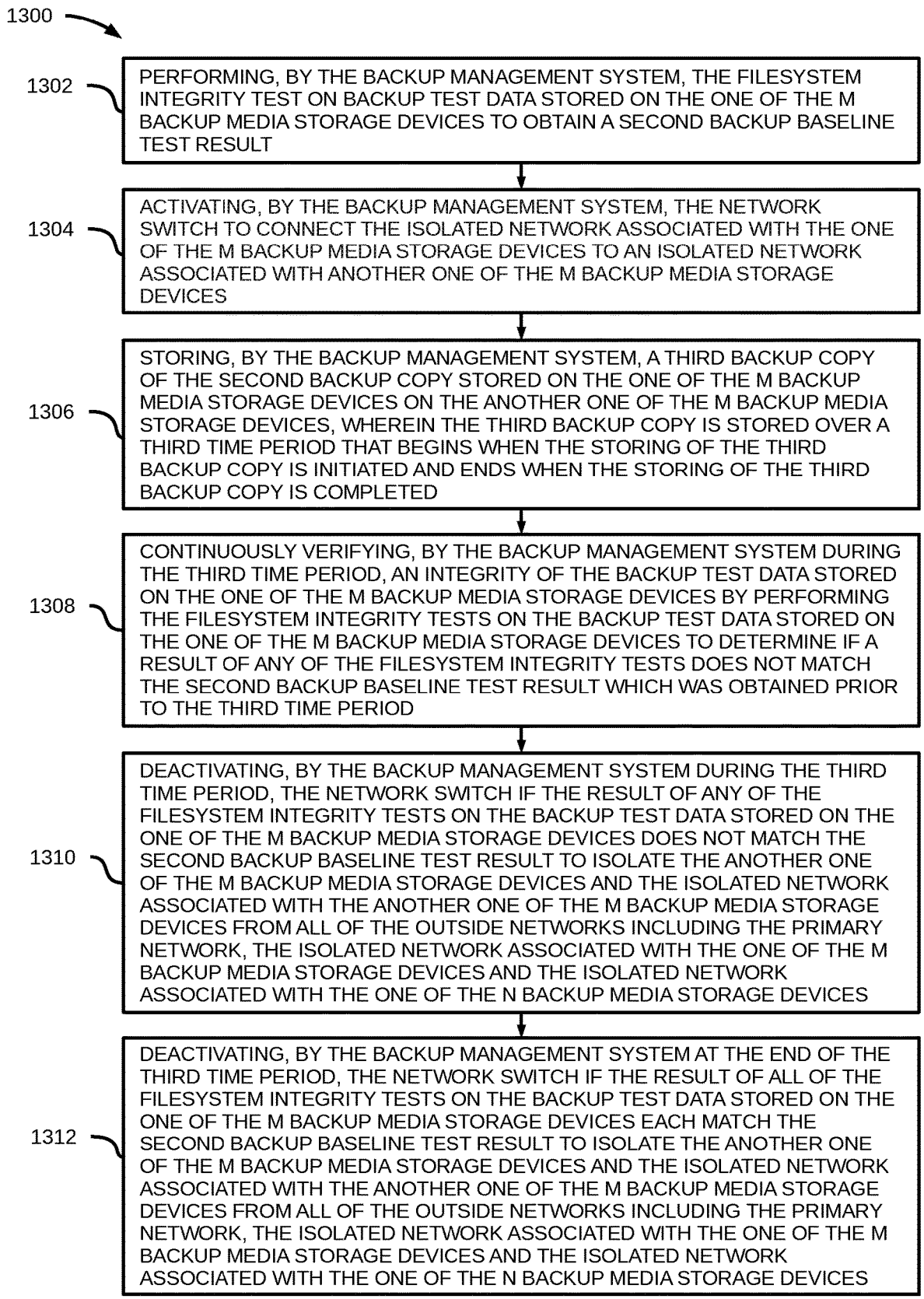
FIG. 13 illustrates a flowchart of an embodiment of a method of performing a backup.

FIG. 13 illustrates a flowchart at 1300 of an embodiment of a method of performing a backup. The method is illustrated at 1300. At 1302, the method includes performing, by the backup management system 116 or the backup management system 504, the filesystem integrity test on backup test data 218 stored on the one of the M backup media storage devices to obtain a second backup baseline test result. The M backup media storage devices can include any of the first backup media storage device 326, second backup media storage device 214 and the Mth backup media storage device 342, where M is an integer that is equal to or greater than 2. The isolated networks associated with the M backup media storage devices can include any of the M isolated networks (first isolated network 322, second isolated network 210 and the Mth isolated network 328), where M is an integer that is equal to or greater than 2.

At 1304, the method includes activating, by the backup management system 116 or the backup management system 504, the network switch 124 to connect the isolated network associated with the one of the M backup media storage devices to an isolated network associated with another one of the M backup media storage devices.

At 1306, the method includes storing, by the backup management system 116 or the backup management system 504, a third backup copy of the second backup copy 216 stored on the one of the M backup media storage devices on the another one of the M backup media storage devices, wherein the third backup copy is stored over a third time period that begins when the storing of the third backup copy is initiated and ends when the storing of the third backup copy is completed.

At 1308, the method includes continuously verifying, by the backup management system 116 or the backup management system 504 during the third time period, an integrity of the backup test data 218 stored on the one of the M backup media storage devices by performing the filesystem integrity tests on the backup test data 218 stored on the one of the M backup media storage devices to determine if a result of any of the filesystem integrity tests does not match the second backup baseline test result which was obtained prior to the third time period.

At 1310, the method includes deactivating, by the backup management system 116 or the backup management system 504 during the third time period, the network switch 124 if the result of any of the filesystem integrity tests on the backup test data 218 stored on the one of the M backup media storage devices does not match the second backup baseline test result to isolate the another one of the M backup media storage devices and the isolated network associated with the another one of the M backup media storage devices from all of the outside networks including the primary network 102, the isolated network associated with the one of the M backup media storage devices and the isolated network associated with the one of the N backup media storage devices.

At 1312, the method includes deactivating, by the backup management system 116 or the backup management system 504 at the end of the third time period, the network switch 124 if the result of all of the filesystem integrity tests on the backup test data 218 stored on the one of the M backup media storage devices each match the second backup baseline test result to isolate the another one of the M backup media storage devices and the isolated network associated with the another one of the M backup media storage devices from all of the outside networks including the primary network 102, the isolated network associated with the one of the M backup media storage devices and the isolated network associated with the one of the N backup media storage devices.

The detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIGS. 1 through 19. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A method, comprising:
    performing, by a backup management system, a backup process for each one of N backup media storage devices, wherein N is an integer equal to or greater than 1, the backup process comprising:
        performing, by the backup management system, a filesystem integrity test on test data stored on a device connected to a primary network to obtain a baseline test result;
        activating, by the backup management system, a network switch to connect the primary network to an isolated network associated with one of the N backup media storage devices;
        storing, by the backup management system, a first backup copy of the user data stored on the device on the one of the N backup media storage devices, wherein the first backup copy is stored over a first time period that begins when the storing of the first backup copy is initiated and ends when the storing of the first backup copy is completed;
        continuously verifying, by the backup management system during the first time period, an integrity of the test data by performing filesystem integrity tests on the test data to determine if a result of any of the filesystem integrity tests does not match the baseline test result which was obtained prior to the first time period;
        deactivating, by the backup management system during the first time period, the network switch if the result of any of the filesystem integrity tests on the test data does not match the baseline test result to isolate the one of the N backup media storage devices and the isolated network associated with the one of the N backup media storage devices from all outside networks including the primary network; and
        deactivating, by the backup management system at the end of the first time period, the network switch if the result of all of the filesystem integrity tests on the test data each match the baseline test result to isolate the one of the N backup media storage devices and the isolated network associated with the one of the N backup media storage devices from all outside networks including the primary network.

2. The method of claim 1, wherein performing the backup process for each one of the N backup media storage devices comprises performing the backup process for each one of the N backup media storage devices at different points in time for a set of N successive times, wherein N is greater than 1, wherein the set of the N successive times corresponds to a backup cycle for the N backup media storage devices, and wherein the backup cycle is a repeating backup cycle.

3. The method of claim 1, further comprising:
    performing, by the backup management system, the backup process for each one of M backup media storage devices, wherein M is an integer that is equal to or greater than 1, the backup process comprising:
        performing, by the backup management system, the filesystem integrity test on backup test data stored on the one of the N backup media storage devices to obtain a first backup baseline test result;
        activating, by the backup management system, the network switch to connect the isolated network associated with the one of the N backup media storage devices to an isolated network associated with one of the M backup media storage devices;
        storing, by the backup management system, a second backup copy of the first backup copy stored on the one of the N backup media storage devices on the one of the M backup media storage devices, wherein the second backup copy is stored over a second time period that begins when the storing of the second backup copy is initiated and ends when the storing of the second backup copy is completed;

continuously verifying, by the backup management system during the second time period, an integrity of the backup test data by performing the filesystem integrity tests on the backup test data to determine if a result of any of the filesystem integrity tests does not match the first backup baseline test result which was obtained prior to the second time period;

deactivating, by the backup management system during the second time period, the network switch if the result of any of the filesystem integrity tests on the backup test data does not match the first backup baseline test result to isolate the one of the M backup media storage devices and the isolated network associated with the one of the M backup media storage devices from all of the outside networks including the primary network and the isolated network associated with the one of the N backup media storage devices; and deactivating, by the backup management system at the end of the second time period, the network switch if the result of all of the filesystem integrity tests on the backup test data each match the first backup baseline test result to isolate the one of the M backup media storage devices and the isolated network associated with the one of the M backup media storage devices from all of the outside networks including the primary network and the isolated network associated with the one of the N backup media storage devices.

4. The method of claim 3, further comprising:

performing, by the backup management system, the filesystem integrity test on backup test data stored on the one of the M backup media storage devices to obtain a second backup baseline test result;

activating, by the backup management system, the network switch to connect the isolated network associated with the one of the M backup media storage devices to an isolated network associated with another one of the M backup media storage devices;

storing, by the backup management system, a third backup copy of the second backup copy stored on the one of the M backup media storage devices on the another one of the M backup media storage devices, wherein the third backup copy is stored over a third time period that begins when the storing of the third backup copy is initiated and ends when the storing of the third backup copy is completed;

continuously verifying, by the backup management system during the third time period, an integrity of the backup test data stored on the one of the M backup media storage devices by performing the filesystem integrity tests on the backup test data stored on the one of the M backup media storage devices to determine if a result of any of the filesystem integrity tests does not match the second backup baseline test result which was obtained prior to the third time period;

deactivating, by the backup management system during the third time period, the network switch if the result of any of the filesystem integrity tests on the backup test data stored on the one of the M backup media storage devices does not match the second backup baseline test result to isolate the another one of the M backup media storage devices and the isolated network associated with the another one of the M backup media storage devices from all of the outside networks including the primary network, the isolated network associated with the one of the M backup media storage devices and the isolated network associated with the one of the N backup media storage devices; and deactivating, by the backup management system at the end of the third time period, the network switch if the result of all of the filesystem integrity tests on the backup test data stored on the one of the M backup media storage devices each match the second backup baseline test result to isolate the another one of the M backup media storage devices and the isolated network associated with the another one of the M backup media storage devices from all of the outside networks including the primary network, the isolated network associated with the one of the M backup media storage devices and the isolated network associated with the one of the N backup media storage devices.

5. The method of claim 4, wherein the second time period and the third time period at least partially overlap in time.

6. The method of claim 1, wherein determining if the result of any of the filesystem integrity tests does not match the baseline test result comprises:

applying, for each one of the filesystem integrity tests, a secure hashing algorithm to the test data to obtain a hash result for the test data; and comparing the hash result for the test data to the baseline test result, wherein the baseline test result is a baseline hash result obtained by applying the secure hashing algorithm to the test data prior to the first time period.

7. The method of claim 1, wherein continuously verifying the integrity of the test data comprises:

simultaneously performing the filesystem integrity tests on the test data and storing the first backup copy of the user data on the first backup media storage device.

8. The method of claim 3, wherein determining if the result of any of the filesystem integrity tests does not match the first backup baseline test result comprises:

applying, for each one of the filesystem integrity tests, the secure hashing algorithm to the backup test data stored on the one of the N backup media storage devices to obtain a hash result for the backup test data stored on the one of the N backup media storage devices; and comparing the hash result for the backup test data stored on the one of the N backup media storage devices to the first backup baseline test result, wherein the first backup baseline test result is a first backup baseline hash result obtained by applying the secure hashing algorithm to the backup test data stored on the one of the N backup media storage devices prior to the second time period.

9. The method of claim 3, wherein continuously verifying the integrity of the backup test data comprises:

simultaneously performing the filesystem integrity tests on the backup test data stored on the one of the N backup media storage devices and storing the second backup copy on the one of the M backup media storage devices.

10. The method of claim 1, wherein performing the filesystem integrity tests on the test data and storing the first backup copy on the one of the N backup media storage devices comprises the backup management system having read-only access to the user data and the test data stored on the device, and having read-only access to the one of the N backup media storage devices.

11. A backup management system, comprising:
at least one processor; and
at least one memory storing program instructions that when executed by the at least one processor cause the backup management system to perform a backup process for each one of N backup media storage devices, wherein N is an integer equal to or greater than 1, the backup process comprising:

performing, by the backup management system, a filesystem integrity test on test data stored on a device connected to a primary network to obtain a baseline test result;

activating, by the backup management system, a network switch to connect the primary network to an isolated network associated with one of the N backup media storage devices;

storing, by the backup management system, a first backup copy of the user data stored on the device on the one of the N backup media storage devices, wherein the first backup copy is stored over a first time period that begins when the storing of the first backup copy is initiated and ends when the storing of the first backup copy is completed;

continuously verifying, by the backup management system during the first time period, an integrity of the test data by performing filesystem integrity tests on the test data to determine if a result of any of the filesystem integrity tests does not match the baseline test result which was obtained prior to the first time period;

deactivating, by the backup management system during the first time period, the network switch if the result of any of the filesystem integrity tests on the test data does not match the baseline test result to isolate the one of the N backup media storage devices and the isolated network associated with the one of the N backup media storage devices from all outside networks including the primary network; and deactivating, by the backup management system at the end of the first time period, the network switch if the result of all of the filesystem integrity tests on the test data each match the baseline test result to isolate the one of the N backup media storage devices and the isolated network associated with the one of the N backup media storage devices from all outside networks including the primary network.

12. The backup management system of claim 11, wherein performing the backup process for each one of the N backup media storage devices comprises performing the backup process for each one of the N backup media storage devices at different points in time for a set of N successive times, wherein N is greater than 1, wherein the set of the N successive times corresponds to a backup cycle for the N backup media storage devices, and wherein the backup cycle is a repeating backup cycle.

13. The backup management system of claim 11, wherein the at least one memory stores further program instructions that when executed by the at least one processor causes the backup management system to perform the backup process for each one of M backup media storage devices, wherein M is an integer that is equal to or greater than 1, the backup process comprising:

performing, by the backup management system, the filesystem integrity test on backup test data stored on the one of the N backup media storage devices to obtain a first backup baseline test result;

activating, by the backup management system, the network switch to connect the isolated network associated with the one of the N backup media storage devices to an isolated network associated with one of the M backup media storage devices;

storing, by the backup management system, a second backup copy of the first backup copy stored on the one of the N backup media storage devices on the one of the M backup media storage devices, wherein the second backup copy is stored over a second time period that begins when the storing of the second backup copy is initiated and ends when the storing of the second backup copy is completed;

continuously verifying, by the backup management system during the second time period, an integrity of the backup test data by performing the filesystem integrity tests on the backup test data to determine if a result of any of the filesystem integrity tests does not match the first backup baseline test result which was obtained prior to the second time period;

deactivating, by the backup management system during the second time period, the network switch if the result of any of the filesystem integrity tests on the backup test data does not match the first backup baseline test result to isolate the one of the M backup media storage devices and the isolated network associated with the one of the M backup media storage devices from all of the outside networks including the primary network and the isolated network associated with the one of the N backup media storage devices; and deactivating, by the backup management system at the end of the second time period, the network switch if the result of all of the filesystem integrity tests on the backup test data each match the first backup baseline test result to isolate the one of the M backup media storage devices and the isolated network associated with the one of the M backup media storage devices from all of the outside networks including the primary network and the isolated network associated with the one of the N backup media storage devices.

14. The backup management system of claim 13, further comprising:

performing, by the backup management system, the filesystem integrity test on backup test data stored on the one of the M backup media storage devices to obtain a second backup baseline test result;

activating, by the backup management system, the network switch to connect the isolated network associated with the one of the M backup media storage devices to an isolated network associated with another one of the M backup media storage devices;

storing, by the backup management system, a third backup copy of the second backup copy stored on the one of the M backup media storage devices on the another one of the M backup media storage devices, wherein the third backup copy is stored over a third time period that begins when the storing of the third backup copy is initiated and ends when the storing of the third backup copy is completed;

continuously verifying, by the backup management system during the third time period, an integrity of the backup test data stored on the one of the M backup media storage devices by performing the filesystem integrity tests on the backup test data stored on the one of the M backup media storage devices to determine if a result of any of the filesystem integrity tests does not match the second backup baseline test result which was obtained prior to the third time period;

deactivating, by the backup management system during the third time period, the network switch if the result of any of the filesystem integrity tests on the backup test data stored on the one of the M backup media storage devices does not match the second backup baseline test result to isolate the another one of the M backup media storage devices and the isolated network associated with the another one of the M backup media storage devices from all of the outside networks including the primary network, the isolated network associated with the one of the M backup media storage devices and the isolated network associated with the one of the N backup media storage devices; and deactivating, by the backup management system at the end of the third time period, the network switch if the result of all of the filesystem integrity tests on the backup test data stored on the one of the M backup media storage devices each match the second backup baseline test result to isolate the another one of the M backup media storage devices and the isolated network associated with the another one of the M backup media storage devices from all of the outside networks including the primary network, the isolated network associated with the one of the M backup media storage devices and the isolated network associated with the one of the N backup media storage devices.

15. The backup management system of claim 14, wherein the second time period and the third time period at least partially overlap in time.

16. The backup management system of claim 11, wherein determining if the result of any of the filesystem integrity tests does not match the baseline test result comprises:
    applying, for each one of the filesystem integrity tests, a secure hashing algorithm to the test data to obtain a hash result for the test data; and
    comparing the hash result for the test data to the baseline test result, wherein the baseline test result is a baseline hash result obtained by applying the secure hashing algorithm to the test data prior to the first time period.

17. The backup management system of claim 11, wherein continuously verifying the integrity of the test data comprises:
    simultaneously performing the filesystem integrity tests on the test data and storing the first backup copy of the user data on the first backup media storage device.

18. One or more non-transitory, computer-readable storage media, storing program instructions that when executed on or across one or more computing devices each having at least one processor causes the one or more computing devices to perform a backup process for each one of N backup media storage devices, wherein N is an integer equal to or greater than 1, the backup process comprising:
    performing, by the backup management system, a filesystem integrity test on test data stored on a device connected to a primary network to obtain a baseline test result;
    activating, by the backup management system, a network switch to connect the primary network to an isolated network associated with one of the N backup media storage devices;
    storing, by the backup management system, a first backup copy of the user data stored on the device on the one of the N backup media storage devices, wherein the first backup copy is stored over a first time period that begins when the storing of the first backup copy is initiated and ends when the storing of the first backup copy is completed;
    continuously verifying, by the backup management system during the first time period, an integrity of the test data by performing filesystem integrity tests on the test data to determine if a result of any of the filesystem integrity tests does not match the baseline test result which was obtained prior to the first time period;
    deactivating, by the backup management system during the first time period, the network switch if the result of any of the filesystem integrity tests on the test data does not match the baseline test result to isolate the one of the N backup media storage devices and the isolated network associated with the one of the N backup media storage devices from all outside networks including the primary network; and
    deactivating, by the backup management system at the end of the first time period, the network switch if the result of all of the filesystem integrity tests on the test data each match the baseline test result to isolate the one of the N backup media storage devices and the isolated network associated with the one of the N backup media storage devices from all outside networks including the primary network.

19. The one or more non-transitory, computer-readable storage media of claim 18, wherein performing the backup process for each one of the N backup media storage devices comprises performing the backup process for each one the N backup media storage devices at different points in time for a set of N successive times, wherein N is greater than 1, wherein the set of the N successive times corresponds to a backup cycle for the N backup media storage devices, and wherein the backup cycle is a repeating backup cycle.

20. The one or more non-transitory, computer-readable storage media of claim 18, further comprising:
    performing, by the backup management system, the backup process for each one of M backup media storage devices, wherein M is an integer that is equal to or greater than one, the backup process comprising:
    performing, by the backup management system, the filesystem integrity test on backup test data stored on the one of the N backup media storage devices to obtain a first backup baseline test result;
    activating, by the backup management system, the network switch to connect the isolated network associated with the one of the N backup media storage devices to an isolated network associated with one of the M backup media storage devices;
    storing, by the backup management system, a second backup copy of the first backup copy stored on the one of the N backup media storage devices on the one of the M backup media storage devices, wherein the second backup copy is stored over a second time period that begins when the storing of the second backup copy is initiated and ends when the storing of the second backup copy is completed;
    continuously verifying, by the backup management system during the second time period, an integrity of the backup test data by performing the filesystem integrity tests on the backup test data to determine if a result of any of the filesystem integrity tests does not match the first backup baseline test result which was obtained prior to the second time period;
    deactivating, by the backup management system during the second time period, the network switch if the result of any of the filesystem integrity tests on the backup test data does not match the first backup baseline test result to isolate the one of the M backup media storage devices and the isolated network associated with the one of the M backup media storage devices from all of the outside networks including the primary network and the isolated network associated with the one of the N backup media storage devices; and
    deactivating, by the backup management system at the end of the second time period, the network switch if the result of all of the filesystem integrity tests on the backup test data each match the first backup baseline test result to isolate the one of the M backup media storage devices and the isolated network associated with the one of the M backup media storage devices from all of the outside networks including the primary network and the isolated network associated with the one of the N backup media storage devices.

21. The one or more non-transitory, computer-readable storage media of claim 20, further comprising:
performing, by the backup management system, the filesystem integrity test on the backup test data stored on the one of the M backup media storage devices to obtain a second backup baseline test result;
activating, by the backup management system, the network switch to connect the isolated network associated with the one of the M backup media storage devices to an isolated network associated with another one of the M backup media storage devices;
storing, by the backup management system, a third backup copy of the second backup copy stored on the one of the M backup media storage devices on the another one of the M backup media storage devices, wherein the third backup copy is stored over a third time period that begins when the storing of the third backup copy is initiated and ends when the storing of the third backup copy is completed;
continuously verifying, by the backup management system during the third time period, an integrity of the backup test data stored on the one of the M backup media storage devices by performing the filesystem integrity tests on the backup test data stored on the one of the M backup media storage devices to determine if a result of any of the filesystem integrity tests does not match the second backup baseline test result which was obtained prior to the third time period;
deactivating, by the backup management system during the third time period, the network switch if the result of any of the filesystem integrity tests on the backup test data stored on the one of the M backup media storage devices does not match the second backup baseline test result to isolate the another one of the M backup media storage devices and the isolated network associated with the another one of the M backup media storage devices from all of the outside networks including the primary network, the isolated network associated with the one of the M backup media storage devices and the isolated network associated with the one of the N backup media storage devices; and
deactivating, by the backup management system at the end of the third time period, the network switch if the result of all of the filesystem integrity tests on the backup test data stored on the one of the M backup media storage devices each match the second backup baseline test result to isolate the another one of the M backup media storage devices and the isolated network associated with the another one of the M backup media storage devices from all of the outside networks including the primary network, the isolated network associated with the one of the M backup media storage devices and the isolated network associated with the one of the N backup media storage devices.

22. The one or more non-transitory, computer-readable storage media of claim 21, wherein the second time period and the third time period at least partially overlap in time.

23. The one or more non-transitory, computer-readable storage media of claim 18, wherein determining if the result of any of the filesystem integrity tests does not match the baseline test result comprises:
applying, for each one of the filesystem integrity tests, a secure hashing algorithm to the test data to obtain a hash result for the test data; and
comparing the hash result for the test data to the baseline test result, wherein the baseline test result is a baseline hash result obtained by applying the secure hashing algorithm to the test data prior to the first time period.

24. The one or more non-transitory, computer-readable storage media of claim 18, wherein continuously verifying the integrity of the test data comprises:
simultaneously performing the filesystem integrity tests on the test data and storing the first backup copy of the user data on the first backup media storage device.

* * * * *